(12) United States Patent
Liu et al.

(10) Patent No.: US 11,811,508 B2
(45) Date of Patent: Nov. 7, 2023

(54) METHOD AND DEVICE FOR TRANSMITTING REFERENCE SIGNALS

(71) Applicant: NTT DOCOMO, INC., Tokyo (JP)

(72) Inventors: Wenjia Liu, Beijing (CN); Runxin Wang, Beijing (CN); Xiaolin Hou, Beijing (CN); Xin Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 293 days.

(21) Appl. No.: 17/266,800

(22) PCT Filed: Aug. 9, 2018

(86) PCT No.: PCT/CN2018/099668
§ 371 (c)(1),
(2) Date: Feb. 8, 2021

(87) PCT Pub. No.: WO2020/029182
PCT Pub. Date: Feb. 13, 2020

(65) Prior Publication Data
US 2021/0297202 A1 Sep. 23, 2021

(51) Int. Cl.
| H04L 5/00 | (2006.01) |
| H04W 72/044 | (2023.01) |
| H04W 72/23 | (2023.01) |
| H04W 72/0453 | (2023.01) |
| H04W 72/0446 | (2023.01) |
| H04W 72/121 | (2023.01) |

(52) U.S. Cl.
CPC ............ *H04L 5/0048* (2013.01); *H04L 5/001* (2013.01); *H04L 5/0092* (2013.01); *H04L 5/0094* (2013.01); *H04W 72/0446* (2013.01); *H04W 72/0453* (2013.01); *H04W 72/0473* (2013.01); *H04W 72/23* (2023.01); *H04W 72/121* (2013.01)

(58) Field of Classification Search
CPC ..... H04L 5/001; H04L 5/0048; H04L 5/0092; H04L 5/0094; H04W 72/0446; H04W 72/0453; H04W 72/0473; H04W 72/23
See application file for complete search history.

(56) References Cited

U.S. PATENT DOCUMENTS

| 2020/0037347 A1* | 1/2020 | Yang | H04L 5/0051 |
| 2020/0119879 A1* | 4/2020 | Chen | H04L 5/005 |
| 2020/0287687 A1* | 9/2020 | Li | H04L 5/0023 |

FOREIGN PATENT DOCUMENTS

CN 107046431 A 8/2017

OTHER PUBLICATIONS

International Search Report issued in PCT/CN2018/099668 dated Apr. 28, 2019 (2 pages).

* cited by examiner

*Primary Examiner* — Kevin C. Harper
(74) *Attorney, Agent, or Firm* — Osha Bergman Watanabe & Burton LLP

(57) ABSTRACT

A method and device for transmitting reference signals are provided in the present disclosure, where the method for transmitting reference signals is performed by a user terminal and time-frequency resources for the user terminal are divided into multiple groups of time-frequency resources. The method includes: selecting a reference signal port for each group of time-frequency resources from candidate reference signal ports; and transmitting reference signals by using the reference signal port corresponding to each group of time-frequency resources.

12 Claims, 9 Drawing Sheets

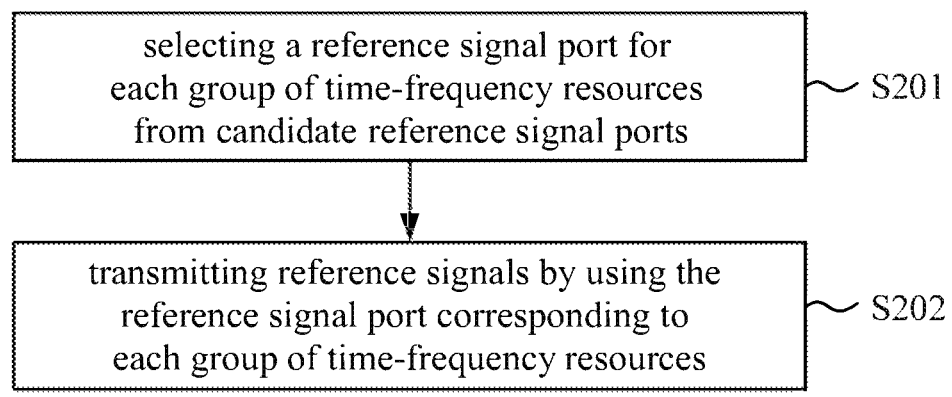
FIG. 2
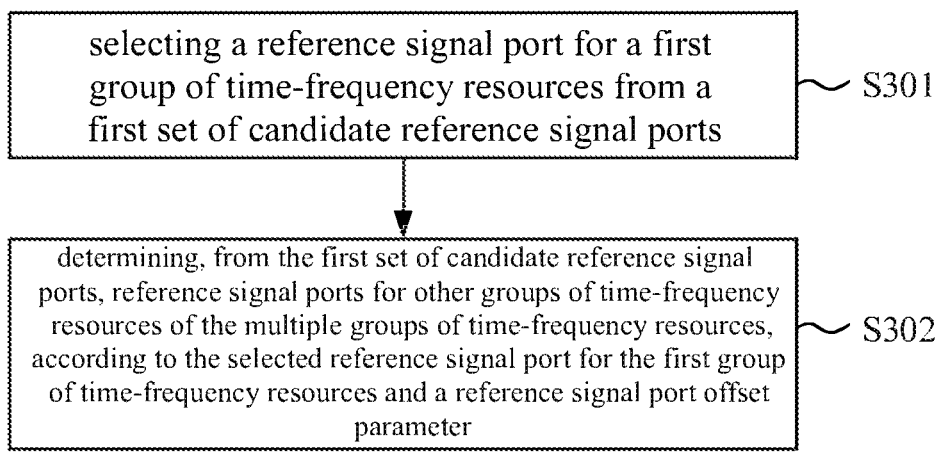

METHOD AND DEVICE FOR TRANSMITTING REFERENCE SIGNALS

TECHNICAL FIELD

The present disclosure relates to a field of mobile communication, and in particular to a method and a device for transmitting reference signals.

BACKGROUND

In order to reduce signaling overhead, it has been proposed to employ a grant-free uplink for information transmission in a Machine Type Communication (MTC) system. In this transmission mode, a user terminal can transmit information to a base station without a grant from the base station. Therefore, a plurality of user terminals may simultaneously transmit information to the base station.

In the MTC system, the user terminal transmits an uplink reference signal, such as a Demodulation Reference Signal (DMRS), to the base station, so that the base station performs channel estimation based on the uplink reference signal to detect and demodulate information transmitted by the user terminal. However, since reference signal ports are limited, there is a situation in which a plurality of user terminals transmit uplink reference signals to the base station on one reference signal port. In this situation, collisions occur between the uplink reference signals transmitted by the plurality of user terminals, resulting in the base station being unable to perform channel estimation for each user terminal based on the received reference signals.

In order to reduce the collisions among the uplink reference signals, a method of extending reference signal ports has been proposed. However, the extended reference signal ports are still limited, and thus there will still be collisions among uplink reference signals.

SUMMARY OF THE DISCLOSURE

According to an aspect of the present disclosure, a method for transmitting reference signals performed by a user terminal is provided, where time-frequency resources for the user terminal are divided into multiple groups of time-frequency resources. The method comprises: selecting a reference signal port for each group of time-frequency resources from candidate reference signal ports; and transmitting reference signals by using the reference signal port corresponding to each group of time-frequency resources.

According to another aspect of the present disclosure, a user terminal is provided, where time-frequency resources for the user terminal are divided into multiple groups of time-frequency resources. The user terminal comprises: a selecting unit configured to select a reference signal port for each group of time-frequency resources from candidate reference signal ports; and a transmitting unit configured to transmit reference signals by using the reference signal port corresponding to each group of time-frequency resources.

According to another aspect of the present disclosure, a method for receiving reference signals performed by a base station is provided. The method comprises: detecting, separately on multiple groups of time-frequency resources for a first user terminal, first-type reference signals that are transmitted by the first user terminal by using a reference signal port corresponding to each group of time-frequency resources, where time-frequency resources for the first user terminal are divided into the multiple groups of time-frequency resources; determining first-type reference signals of the detected first-type reference signals that do not collide with first-type reference signals transmitted by a second user terminal; and estimating a channel condition of the first user terminal according to the determined first-type reference signals.

According to another aspect of the present disclosure, a base station is provided. The base station comprises: a detecting unit configured to detect, separately on multiple groups of time-frequency resources for a first user terminal, first-type reference signals that are transmitted by the first user terminal by using a reference signal port corresponding to each group of time-frequency resources, where time-frequency resources for the first user terminal are divided into the multiple groups of time-frequency resources; a determining unit configured to determine first-type reference signals of the detected first-type reference signals that do not collide with first-type reference signals transmitted by a second user terminal; and an estimating unit configured to estimate a channel condition of the first user terminal according to the determined first-type reference signals.

BRIEF DESCRIPTION OF THE DRAWINGS

The above and other objectives, features and advantages of the present disclosure will become clearer by describing embodiments of the present disclosure in details in conjunction with accompanying drawings. The accompanying drawings are used to provide a further understanding of the embodiments of the present disclosure, constitute a part of this specification, and explain the present disclosure together with the embodiments of the present disclosure, but do not constitute a limitation on the present disclosure. In the accompanying drawings, like reference numerals usually represent like components or steps.

FIG. 2 is a flowchart of a method for transmitting reference signals performed by a user terminal in a communication system according to one embodiment of the present disclosure;

FIG. 3 is a flowchart of a method for the user terminal to select a reference signal port for each group of time-frequency resources according to one embodiment of the present disclosure;

DESCRIPTION OF THE EMBODIMENTS

Figure 1:
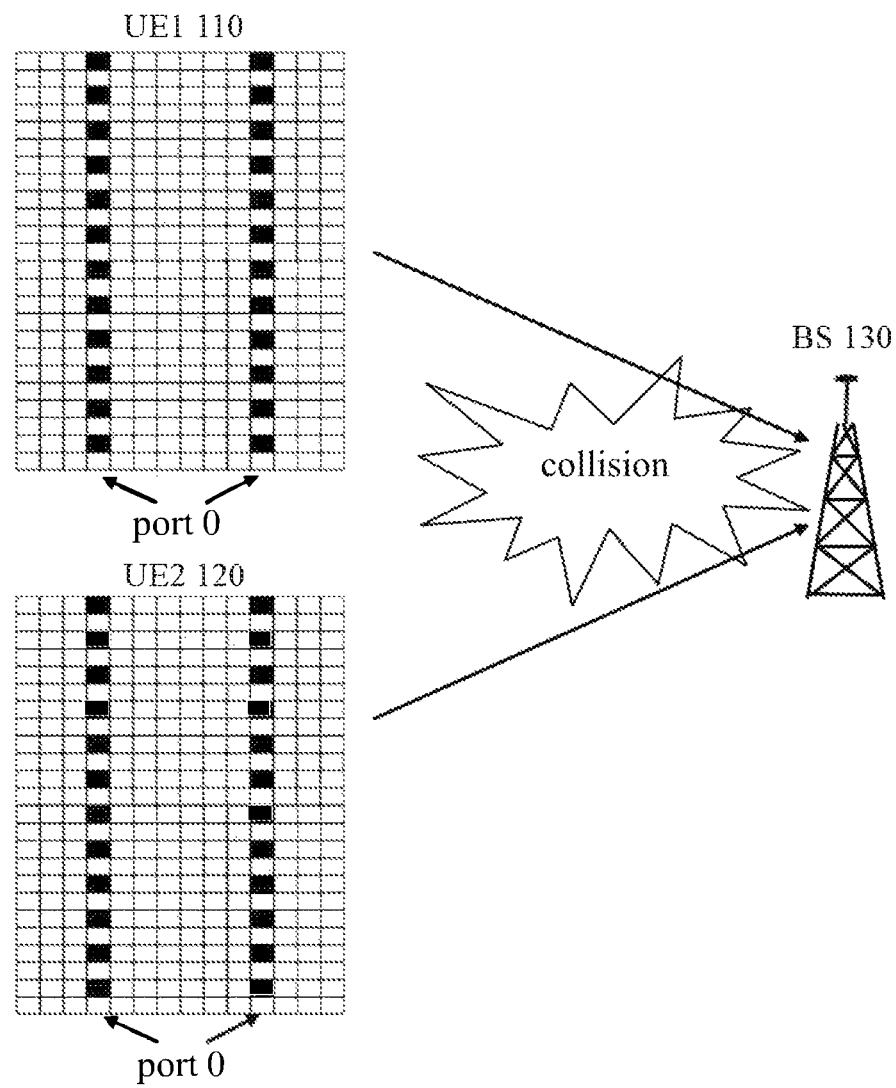
FIG. 1 is a schematic diagram of a wireless communication system in which the embodiments of the present disclosure may be applied.

In order to make objectives, technical solutions and advantages of the present disclosure clearer, exemplary embodiments according to the present disclosure will be described in detail below with reference to the accompanying drawings. Like reference numerals refer to like elements throughout the accompanying drawings. It should be understood that the embodiments described herein are merely illustrative and should not be constructed as limiting the scope of the present disclosure. Furthermore, a user terminal described herein may include various types of User Equipment (UE), for example, a mobile terminal (or referred to as a mobile station) or a fixed terminal. However, for convenience, the UE and the mobile station sometimes may be used interchangeably hereinafter. Furthermore, the base station may be a fixed station, a NodeB, an eNodeB (eNB), an access point, a transmitting point, a receiving point, a femto cell, a small cell and the like, which is not limited herein.

First, a schematic diagram of a wireless communication system in which the embodiments of the present disclosure may be applied will be described with reference to FIG. 1. The wireless communication system may be a 5G system or any other type of wireless communication system, such as an LTE system or an LTE-A system. Hereinafter, the embodiments of the present disclosure will be described by using a 5G system as an example. However, it should be appreciated that the following description may also be applied to other types of wireless communication systems.

As shown in FIG. 1, the wireless communication system 100 may include a first user terminal 110, a second user terminal 120, and a Base Station (BS) 130, which is a serving base station for the first user terminal 110 and the second user terminal 120. In the wireless communication system 100, reference signal ports are limited, and for first-type reference signals, only one first-type reference signal is configured on time-frequency resources for a specific user terminal, that is, one first-type reference signal is configured at Transmission Block (TB) level. In the present disclosure, a "first-type reference signal" may be any uplink reference signal for channel estimation between the user terminal and the base station, for example, a Demodulation Reference Signal (DMRS), a Sounding Reference Signal (SRS) and the like. In the following examples, the embodiments of the present disclosure are described by using the "first-type reference signal" being a DMRS as an example. Therefore, in the case of grant-free uplink, the first user terminal 110 and the second user terminal 120 may randomly select a reference signal port from the limited reference signal ports to transmit DMRSs. When the first user terminal 110 and the second user terminal 120 select a same reference signal port to transmit DMRSs, collision occurs between their DMRSs. As a result, the base station 130 cannot distinguish between the first user terminal 110 and the second user terminal 120 according to the received DMRSs, and thus the base station 130 cannot estimate channel conditions of the first user terminal 110 and the second user terminal 120 according to the received DMRSs. It should be appreciated that although one base station and two user terminals are shown in FIG. 1, this is merely illustrative, and the wireless communication system may also include more or fewer base stations, and/or more or fewer user terminals. In order to reduce a probability of collision between reference signals of different user terminals, the technical solution of the present disclosure is proposed.

In the present disclosure, for first-type reference signals, a plurality of first-type reference signals may be configured on time-frequency resources for a specific user terminal. In this way, the potential number of first-type reference signals configurable for each user terminal may be increased without extending reference signal ports, thereby reducing the probability of collision between reference signals of different user terminals.

According to one example of the present disclosure, the time-frequency resources for the user terminal may include Physical Resource Blocks (PRBs) and reference signal symbols. In the present disclosure, time-frequency resources for a specific user terminal may be divided into multiple groups of time-frequency resources in frequency domain and/or time domain, and one first-type reference signal is configured on each group of time-frequency resources, that is, the first-type reference signal is configured at PRB and/or symbol level, thereby configuring a plurality of first-type reference signals on the time-frequency resources for the user terminal being realized.

A method for transmitting reference signals performed by a user terminal in a communication system according to an embodiment of the present disclosure will be described below with reference to FIG. 2. FIG. 2 is a flowchart of a method 200 for transmitting reference signals performed by a user terminal in a communication system according to one embodiment of the present disclosure.

As shown in FIG. 2, in step S201, the user terminal selects a reference signal port for each group of time-frequency resources from candidate reference signal ports. In the present disclosure, time-frequency resources for the user terminal may be divided into multiple groups of time-frequency resources. For example, the time-frequency resources for the user terminal may be divided into M groups of time-frequency resources, and the M groups of time-frequency resources may be represented as $S_1, S_2, \ldots, S_M$, where M is a positive integer.

According to one example of the present disclosure, the user terminal may divide the time-frequency resources for the user terminal into multiple groups of time-frequency resources according to time-frequency resource division parameters. For example, the time-frequency resource division parameters may be time-frequency resource granularities used to select reference signal ports, and may be represented by N, where N is a positive integer. For multiple groups of time-frequency resources for the user terminal, a time-frequency resource granularity for each group of time-frequency resources may be set separately. For example, time-frequency resource granularities for respective groups of time-frequency resources may be represented as $N_1, \ldots, N_m, \ldots, N_M$, where $1 \leq m \leq M$ and m is a positive integer. In the present disclosure, $N_1, \ldots, N_m, \ldots, N_M$ may be the same or different. In addition, the time-frequency resources for the user terminal may be divided into multiple groups of time-frequency resources according to the following Formula (1):

$$L = \Sigma_{m=1}^{M} N_m \qquad \text{Formula (1)}$$

where L is the number of time-frequency resources for the user terminal and L is a positive integer.

In this example, the user terminal may divide the time-frequency resources for the user terminal into multiple groups of time-frequency resources in the frequency domain and/or the time domain according to the time-frequency resource division parameters. For example, the user terminal may divide the time-frequency resources for the user terminal into multiple groups of time-frequency resources in the frequency domain according to the time-frequency resource division parameters. In this case, the time-frequency resource division parameters may be PRB granularities used to select reference signal ports, that is, the user terminal may divide PRBs for the user terminal into multiple groups of PRBs according to the time-frequency resource division parameters. L in the above Formula (1) may be the number of PRBs for the user terminal, that is, L PRBs for the user terminal are divided into M groups of PRB s.

For another example, the user terminal may divide the time-frequency resources for the user terminal into multiple groups of time-frequency resources in the time domain according to the time-frequency resource division parameters. In this case, the time-frequency resource division parameters may be symbol granularities used to select reference signal ports, that is, the user terminal may divide reference signal symbols for the user terminal into multiple groups of reference signal symbols according to the time-frequency resource division parameters. The reference signal symbols may be Orthogonal Frequency Division Multiplexing (OFDM) symbols used to transmit reference signals. L in the above Formula (1) may be the number of reference signal symbols for the user terminal, that is, L reference signal symbols for the user terminal are divided into M groups of reference signal symbols. In addition, in a single-symbol DMRS system, L reference signal symbols may correspond to L OFDM symbols. In a multi-symbol DMRS system, L reference signal symbols may correspond to more than L OFDM symbols. For example, in a dual-symbol DMRS system, L reference signal symbols may correspond to 2L OFDM symbols.

It should be appreciated that the user terminal may also divide the time-frequency resources for the user terminal into multiple groups of time-frequency resources in the frequency domain and the time domain according to the time-frequency resource division parameters. For example, $L_1$ PRBs and $L_2$ reference signal symbols for the user terminal may be divided into M groups, and the number of PRBs or reference signal symbols included in each group may be the same or different, where $L_1$ and $L_2$ are both positive integers and $L=L_1 L_2$.

An example of dividing the time-frequency resources for the user terminal in the frequency domain will be described below by taking $N_1, \ldots, N_m, \ldots, N_M$ being the same as an example. For example, the number of PRBs for the user terminal is 6 (i.e., L=6) and indexes of the 6 PRBs are 1-6 sequentially, and when the time-frequency resource division parameters are 1 (i.e., $N_1=N_m=\ldots=N_M=1$), the 6 PRBs may be divided into 6 groups (i.e., M=6), which are respectively $S_1, S_2, S_3, S_4, S_5, S_6$. Each group includes only one PRB, for example, $S_1=\{1\}$, $S_2=\{2\}$, $S_3=\{3\}$, $S_4=\{4\}$, $S_5=\{5\}$, $S_6=\{6\}$.

For another example, the number of PRBs for the user terminal is 6 (i.e., L=6) and indexes of the 6 PRBs are 1-6 sequentially, and when the time-frequency resource division parameters are 2 (i.e., $N_1=N_m=\ldots=N_M=2$), the 6 PRBs may be divided into 3 groups (i.e., M=3), which are respectively $S_1, S_2, S_3$. Each group includes two PRBs. The two PRBs included in each group may be continuous, for example, $S_1=\{1, 2\}$, $S_2=\{3, 4\}$, $S_3=\{5, 6\}$. Alternatively, the two PRBs included in each group may be discontinuous, for example, $S_1=\{1, 4\}$, $S_2=\{2, 5\}$, $S_3=\{3, 6\}$.

An example of dividing the time-frequency resources for the user terminal in the frequency domain will be described below by taking $N_1, \ldots, N_m, \ldots, N_M$ being different as an example. For example, the number of PRBs for the user terminal is 6 (i.e., L=6) and indexes of the 6 PRBs are 1-6 sequentially, and when the time-frequency resource division parameters are 2 and 4 (i.e., $N_1=2, N_2=4$), the 6 PRBs may be divided into 2 groups (i.e., M=2), which are respectively $S_1, S_2$. Each group includes two or four PRBs. The PRBs included in each group may be continuous, for example, $S_1=\{1, 2\}, S_2=\{3, 4, 5, 6\}$. Alternatively, the PRBs included in each group may be discontinuous, for example, $S_1=\{1, 4\}$, $S_2=\{2, 3, 5, 6\}$.

An example of dividing the time-frequency resources for the user terminal in the time domain will be described below by taking $N_1, \ldots, N_m, \ldots, N_M$ being the same as an example. For example, in the case of single-symbol DMRS, there are 2 reference signal symbols for the user terminal (i.e., L=2) and symbol positions are $l_1=4$ (the fourth OFDM symbol) and $l_2=11$ (the eleventh OFDM symbol) respectively. When the time-frequency resource division parameters are 1 (i.e., $N_1=N_m=\ldots=N_M=1$), the 2 reference signal symbols may be divided into 2 groups (i.e., M=2), which are respectively $S_1, S_2$, for example $S_1=\{4\}$, $S_2=\{11\}$. For another example, in the case of multi-symbol (for example, dual-symbol) DMRS, there are 2 reference signal symbols for the user terminal (i.e., L=2) and symbol positions are $l_1=4$ and 5 (the fourth and fifth OFDM symbols) and $l_2=11$ and 12 (the eleventh and twelfth OFDM symbols) respectively. When the time-frequency resource division parameters are 1 (i.e., $N_1=N_m=\ldots=N_M=1$), the 2 reference signal symbols may be divided into 2 groups (i.e., M=2), which are respectively $S_1, S_2$, for example $S_1=\{4, 5\}$, $S_2=\{11, 12\}$.

An example of dividing the time-frequency resources for the user terminal in the frequency domain and the time domain will be described below by taking $N_1, \ldots, N_m, \ldots, N_M$ being the same as an example. For example, in the case of single-symbol DMRS, the number of PRBs for the user terminal is 2 (i.e., $L_1=2$) and indexes of the 2 PRBs are 1-2 sequentially, and there are 2 reference signal symbols for the user terminal (i.e., $L_2=2$) and symbol positions are $l_1=4$ (the fourth OFDM symbol) and $l_2=11$ (the eleventh OFDM symbol) respectively. When the time-frequency resource division parameters are 2 (e.g., $N_1=N_2=\ldots=N_M=2$), the 2 PRBs and the 2 reference signal symbols may be divided into 2 groups (i.e., M=2), which are respectively $S_1$, $S_2$. For example, each group may include one PRB and two reference signal symbols, such as $S_1=\{(1, 4), (1, 11)\}$, $S_2=\{(2, 4), (2, 11)\}$. For another example, each group may include two PRBS and one reference signal symbol, for example, $S_1=\{(1, 4), (2, 4)\}$, $S_2=\{(1, 11), (2, 11)\}$. For another example, when the time-frequency resource division parameters are 2, $N_1=3$ and $N_2=1$. In this situation, a first group may include two PRBs and two reference signal symbols, while a second group may include one PRB and one reference signal symbol, for example, $S_1=\{(1, 4), (1, 11), (2, 4)\}$, $S_2=\{(2, 11)\}$.

In addition, according to one example of the present disclosure, the time-frequency resource division parameters may be received by the user terminal from the base station. For example, the base station may set the time-frequency resource division parameters for the user terminal, and notify the user terminal of the set time-frequency resource division parameters by using Radio Resource Control (RRC) signaling, Downlink Control Information (DCI), Media Access Control (MAC) Control Elements (CEs) and the like. Accordingly, the user terminal may divide the time-frequency resources for the user terminal into multiple groups of time-frequency resources according to the received time-frequency resource division parameters.

According to another example of the present disclosure, the time-frequency resource division parameters may also be preset by the user terminal, and does not need to be received from the base station. For example, the user terminal presets the time-frequency resource division parameters according to channel conditions or service conditions, and divides the time-frequency resources for the user terminal into multiple groups of time-frequency resources according to the preset time-frequency resource division parameters.

In addition, according to one example of the present disclosure, a value of the time-frequency resource division parameters may be fixed, for example, N=1 or 2. Alternatively, the value of the time-frequency resource division parameters may also be dynamically changed. For example, when the number of user terminals in the communication system is large, the value of the time-frequency resource division parameters may be reduced; when the number of user terminals in the communication system is small, the value of the time-frequency resource division parameters may be increased. For example, when the number of user terminals in the communication system exceeds a threshold, the value of the time-frequency resource division parameters may be set to 1, that is, N=1; when the number of user terminals in the communication system is equal with or smaller than the threshold, the value of the time-frequency resource division parameters may be set to 2, that is, N=2.

In addition, according to one example of the present disclosure, candidate reference signal ports may constitute one or more sets of candidate reference signal ports. For example, each set of candidate reference signal ports may include at least reference signal ports corresponding to first-subtype reference signals of the first-type reference signals. In the present disclosure, the first-subtype reference signals and second-subtype reference signals are both the first-type reference signals, but the first-subtype reference signals and the second-subtype reference signals have different patterns, sequences, ports, and so on. For example, the first-subtype reference signals and the second-subtype reference signals may be DMRS type 1 and DMRS type 2 which have been specified in the 3GPP standard specification (TS 38.212 v15.2.0) respectively. The DMRS type 1 and DMRS type 2 correspond to different numbers of ports, for example, there are four reference signal ports corresponding to DMRS type 1, and there are six reference signal ports corresponding to DMRS type 2.

In the present disclosure, each set of candidate reference signal ports may only include reference signal ports corresponding to one subtype of reference signals, for example, including only reference signal ports corresponding to DMRS type 1, or including only reference signal ports corresponding to DMRS type 2. Alternatively, each set of candidate reference signal ports may include reference signal ports corresponding to multiple subtypes of reference signals, for example, including both reference signal ports corresponding to DMRS type 1 and reference signal ports corresponding to DMRS type 2.

It should be appreciated that although only two subtypes of DMRSs are described in the above example, the present disclosure is not limited thereto. Subtypes of the first-type reference signals mentioned in the present disclosure may be less than or more than two subtypes. In addition, subtypes of the first-type reference signals mentioned in the present disclosure may include DMRS type 1 and DMRS type 2 that have been specified in the 3GPP standard specification, or may not include DMRS type 1 and DMRS type 2 that have been specified in the 3GPP standard specification but include other subtypes of DMRSs.

In an example, in the case that candidate reference signal ports constitute multiple sets of candidate reference signal ports, the multiple sets of candidate reference signal ports may correspond to multiple groups of time-frequency resources. Specifically, when the time-frequency resources for the user terminal are divided into M groups of time-frequency resources (i.e., $S_1, S_2, \ldots, S_M$), the candidate reference signal ports may constitute M sets of candidate reference signal ports, which, for example, may be represented as $D_1, D_2, \ldots, D_M$, and $D_1, D_2, \ldots, D_M$ correspond to $S_1, S_2, \ldots S_M$ respectively. In this example, the user terminal may select a reference signal port for each group of time-frequency resources from each set of candidate reference signal ports. For example, the user terminal may select a reference signal port for the first group of time-frequency resources (i.e., $S_1$) from the set $D_1$, and select a reference signal port for the second group of time-frequency resources (i.e., $S_2$) from the set $D_2, \ldots$, and select a reference signal port for the M-th group of time-frequency resources (i.e., $S_M$) from the set $D_M$.

In this example, in the case that the candidate reference signal ports constitute one set of candidate reference signal ports, the user terminal may select a reference signal port for each group of time-frequency resources from this set of candidate reference signal ports. For example, some or all of the candidate reference signal ports may constitute one set of candidate reference signal ports. How the user terminal selects a reference signal port for each group of time-frequency resources in this case will be described below in conjunction with FIG. 3. FIG. 3 is a flowchart of a method 300 for the user terminal to select a reference signal port for each group of time-frequency resources according to one embodiment of the present disclosure.

As shown in FIG. 3, in step S301, the user terminal may select a reference signal port for a first group of time-frequency resources from a first set of candidate reference signal ports. For example, the first set of candidate reference signal ports may be one candidate reference signal port set constituted by candidate reference signal ports, and may be represented by Do. The first set of candidate reference signal ports may have k elements, that is, k candidate reference signal ports, which may be represented as $D_0=\{0, 1, 2, \ldots, i, \ldots, (k-1)\}$, where $0 \leq i < k$, and i is a integer and k is a positive integer.

Then, in step S302, the user terminal may determine, from the first set of candidate reference signal ports, reference signal ports for other groups of time-frequency resources of the multiple groups of time-frequency resources, according to the selected reference signal port for the first group of time-frequency resources and a reference signal port offset parameter.

According to one example of the present disclosure, the reference signal port offset parameter may be received by the user terminal from the base station. For example, the base station may set the reference signal port offset parameter for the user terminal, and notify the user terminal of the set reference signal port offset parameter through RRC signaling, DCI, MAC CEs and the like. Accordingly, the user terminal may determine the reference signal ports for other groups of time-frequency resources of the multiple groups of time-frequency resources, according to the received reference signal port offset parameter and the reference signal port for the first group of time-frequency resources.

According to another example of the present disclosure, the reference signal port offset parameter may also be preset by the user terminal, and does not need to be received from the base station. For example, the user terminal presets the reference signal port offset parameter according to channel conditions or service conditions, and determines the reference signal ports for other groups of time-frequency resources of the multiple groups of time-frequency resources, according to the preset reference signal port offset parameter and the reference signal port for the first group of time-frequency resources.

In addition, according to another example of the present disclosure, the reference signal port offset parameter may be a set of candidate reference signal port offset values, and, for example, may be represented by H, which may have s elements, that is, s candidate reference signal port offset values, where s is a positive integer. In this case, the user terminal may determine one or more reference signal port offset values according to the reference signal port offset parameter, and then determine, from the first set of candidate reference signal ports, the reference signal ports for other groups of time-frequency resources of the multiple groups of time-frequency resources, according to the determined reference signal port offset values and the reference signal port for the first group of time-frequency resources.

For example, the user terminal may determine one reference signal port offset value according to the reference signal port offset parameter, and then determine, from the first set of candidate reference signal ports, the reference signal ports for other groups of time-frequency resources of the multiple groups of time-frequency resources sequentially, according to this reference signal port offset value and the reference signal port for the first group of time-frequency resources. For example, the user terminal may select one reference signal port offset value from the set H, and then offset the reference signal port for the first group of time-frequency resources by the selected reference signal port offset value to determine a reference signal port for a second group of time-frequency resources; and then offset the reference signal port for the second group of time-frequency resources by the selected reference signal port offset value to determine a reference signal port for a third group of time-frequency resources; repeat the offsetting operation until reference signal ports for all groups of time-frequency resources are determined.

An example of determining reference signal ports for respective groups of time-frequency resources will be described below by taking $D_0=\{0, 1, 2, 3, 4, 5, 6, 7, 8, 9\}$, $H=\{0, 1, 2, 3\}$ and $M=3$ as an example. For example, in step S301, the user terminal selects port 3 from the set Do as the reference signal port for the first group of time-frequency resources. Then, in step S302, the user terminal selects the reference signal port offset value of 2 from the set H, and determines that port 5 is the reference signal port for the second group of time-frequency resources and port 7 is the reference signal port for the third group of time-frequency resources according to the port 3 and the reference signal port offset value of 2.

For another example, the user terminal may determine multiple reference signal port offset values according to the reference signal port offset parameter, and then determine, from the first set of candidate reference signal ports, the reference signal ports for other groups of time-frequency resources of the multiple groups of time-frequency resources, respectively, according to the multiple reference signal port offset values and the reference signal port for the first group of time-frequency resources. For example, the user terminal may select multiple reference signal port offset values from the set H, which are respectively a first reference signal port offset value, a second reference signal port offset value, . . . and so on, and then offset the reference signal port for the first group of time-frequency resources by the first reference signal port offset value to determine the reference signal port for the second group of time-frequency resources; and then offset the reference signal port for the second group of time-frequency resources by the second reference signal port offset value to determine the reference signal port for the third group of time-frequency resources; repeat the offsetting operation, until reference signal ports for all groups of time-frequency resources are determined.

Another example of determining reference signal ports for each group of time-frequency resources will be described below by taking $D_0=\{0, 1, 2, 3, 4, 5, 6, 7, 8, 9\}$, $H=\{0, 1, 2, 3\}$ and $M=3$ as an example. For example, in step S301, the user terminal selects port 3 from the set Do as the reference signal port for the first group of time-frequency resources. Then, in step S302, the user terminal selects the first reference signal port offset value of 2 and the second reference signal port offset value of 3 from the set H, and determines that port 5 is the reference signal port for the second group of time-frequency resources according to the port 3 and the first reference signal port offset value of 2, and that port 8 is the reference signal port for the third group of time-frequency resources according to the port 5 and the second reference signal port offset value of 3.

Furthermore, according to one example of the present disclosure, in step S201, the user terminal may randomly select a reference signal port for each group of time-frequency resources from the candidate reference signal ports. For example, reference signal ports for respective groups of time-frequency resources may be completely different, or may be partially the same.

Furthermore, according to another example of the present disclosure, in step S201, the user terminal may select a reference signal port for each group of time-frequency resources in a first table, and the first table may include candidate reference signal ports and correspondence between candidate reference signal ports and multiple groups of time-frequency resources. In this example, the first table may be a table pre-defined by the user terminal and pre-stored inside the user terminal. Alternatively, the first table may also be a table transmitted by the base station to the user terminal and stored by the user terminal. Alternatively, the first table may also be a table pre-stored in the user terminal by the manufacturer before the user terminal leaves the factory.

Figure 4:
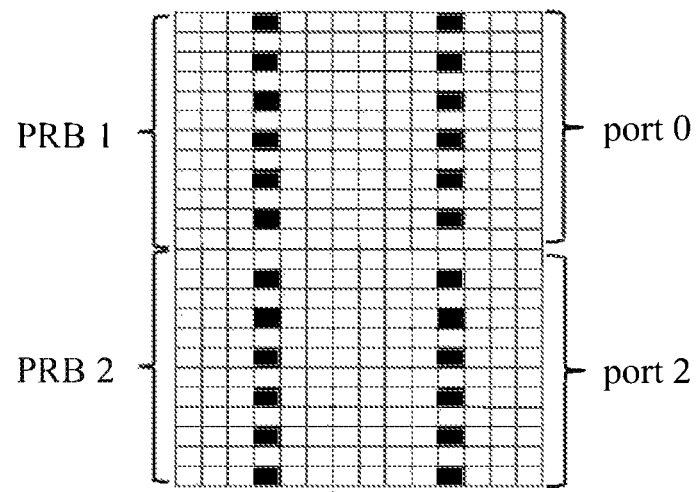
FIG. 4 is a schematic diagram of a reference signal port selected by the user terminal for each group of time-frequency resources according to one embodiment of the present disclosure.

A schematic diagram of reference signal ports selected by the user terminal will be described below in conjunction with FIG. 4. FIG. 4 is a schematic diagram of a reference signal port selected by the user terminal for each group of time-frequency resources according to one embodiment of the present disclosure. As shown in FIG. 4, assuming that the number of PRBs for the user terminal is L=2, the user terminal divides the 2 PRBs into two groups, each group includes 1 PRB, and the user terminal selects reference signal ports for the first group of PRB and the second group of PRB, respectively, namely port 0 and port 2. It can be seen from FIG. 4 that, in the present disclosure, the user terminal may select reference signal ports for PRBs (that is, at RB level), rather than for TBs (that is, at TB level).

Figure 5:
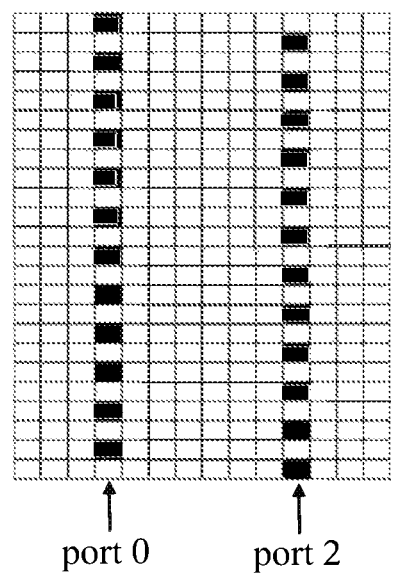
FIG. 5 is another schematic diagram of a reference signal port selected by the user terminal for each group of time-frequency resources according to one embodiment of the present disclosure.

Another schematic diagram of reference signal ports selected by the user terminal will be described below in conjunction with FIG. 5. FIG. 5 is another schematic diagram of a reference signal port selected by the user terminal for each group of time-frequency resources according to one embodiment of the present disclosure. As shown in FIG. 5, assuming that the number of reference signal symbols for the user terminal is L=2, the user terminal divides the 2 reference signal symbols into two groups, each group includes 1 reference signal symbol, and the user terminal selects reference signal ports for the first group of reference signal symbol (that is, the fourth OFDM symbol) and the second group of reference signal symbol (that is, the eleventh OFDM symbol), respectively, namely port 0 and port 2. It can be seen from FIG. 5 that, in the present disclosure, the user terminal may select reference signal ports for symbols (that is, at symbol level), rather than for TBs (that is, at TB level).

Figure 6:
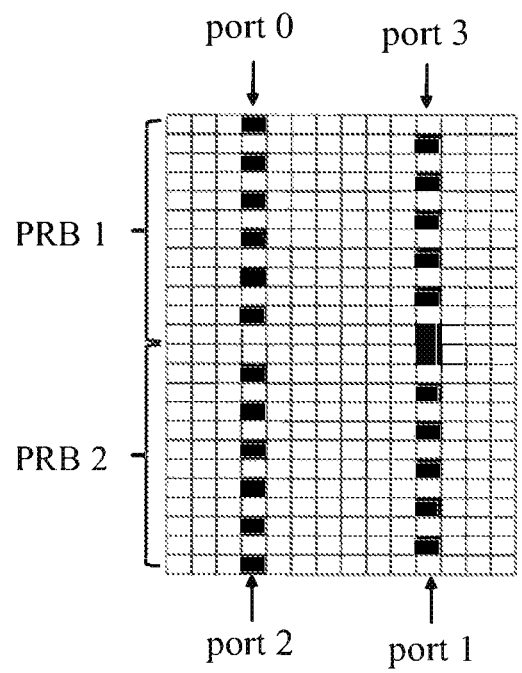
FIG. 6 is another schematic diagram of a reference signal port selected by the user terminal for each group of time-frequency resources according to one embodiment of the present disclosure.

Another schematic diagram of reference signal ports selected by the user terminal will be described below in conjunction with FIG. 6. FIG. 6 is another schematic diagram of a reference signal port selected by the user terminal for each group of time-frequency resources according to one embodiment of the present disclosure. As shown in FIG. 6, assuming that the number of PRBs for the user terminal is $L_1=2$ and the number of reference signal symbols for the user terminal is $L_2=2$ (that is, the fourth OFDM symbol and the eleventh OFDM symbol), the user terminal divides the 2 PRBs and 2 reference signal symbols into 4 groups, each group includes 1 PRB and 1 reference signal symbol, and the user terminal selects reference signal ports, that is, port 0, port 2, port 3 and port 1, for the first group of PRB and reference signal symbol (that is, the first PRB and the fourth OFDM symbol), the second group of PRB and reference signal symbol (that is, the second PRB and the fourth OFDM symbol), the third group of PRB and reference signal symbol (that is, the first PRB and the eleventh OFDM symbol), and the fourth group of PRB and reference signal symbol (that is, the second PRB and the eleventh OFDM symbol), respectively. It can be seen from FIG. 6 that, in the present disclosure, the user terminal may select reference signal ports for PRBs/symbols (that is, at RB/symbol level), rather than for TBs (that is, at TB level).

Then, the method 200 may further include: determining, by the user terminal, a reference signal power parameter for each group of time-frequency resources. For example, the reference signal power parameter may be a power boosting parameter used to transmit reference signals.

According to one example of the present disclosure, the user terminal may receive one or more reference signal power parameters from the base station. For example, the base station may set one or more reference signal power parameters for the user terminal, and notify the user terminal of the set reference signal power parameters through RRC signaling, DCI, MAC CEs and the like. Accordingly, the user terminal may determine the reference signal power parameter for each group of time-frequency resources by receiving RRC signaling, DCI, MAC CEs and the like from the base station.

According to another example of the present disclosure, the user terminal may preset a reference signal power parameter for each group of time-frequency resources without receiving it from the base station. For example, the user terminal may select a reference signal power parameter for each group of time-frequency resources from a predefined set of candidate reference signal power parameters. The set of candidate reference signal power parameters may be represented as P, which may have p elements, for example, $\{a_1, a_2, \ldots, a_p\}$, where p is a positive integer. The user terminal may select the reference signal power parameter for each group of time-frequency resources from the set of candidate reference signal power parameters.

For example, the user terminal may select a reference signal power parameter for the first group of time-frequency resources from the set of candidate reference signal power parameters, and then determine reference signal power parameters for other groups of time-frequency resources of the multiple groups of time-frequency resources according to the reference signal power parameter for the first group of time-frequency resources and a reference signal power offset value. The reference signal power offset value may be an element in a set of candidate reference signal power offset values. The set may be represented by H', and may have s' elements, that is, s' candidate reference signal power offset values, where s' is a positive integer. The set H' mentioned herein may be the same as or different from the set H mentioned above.

An example of determining the reference signal power parameter for each group of time-frequency resources will be described below by taking $P=\{a_1, a_2, a_3, a_4, a_5, a_6, a_7\}$, $H'=\{0, 1, 2, 3\}$ and M=3 as an example. For example, the user terminal selects $a_1$ from the set P as the reference signal power parameter for the first group of time-frequency resources. Then, the user terminal selects the reference signal power offset value of 3 from the set H', and determines that $a_4$ is the reference signal power parameter for the second group of time-frequency resources and $a_7$ is the reference signal power parameter for the third group of time-frequency resources according to $a_1$ and the reference signal power offset value of 3.

For another example, the user terminal may randomly select the reference signal power parameter for each group of time-frequency resources from the set of candidate reference signal power parameters. For example, the reference signal power parameters for each group of time-frequency resources may be completely different, or may be partially the same.

In addition, according to another example of the present disclosure, the user terminal may select the reference signal power parameter for each group of time-frequency resources in a second table, and the second table may include candidate reference signal power parameters and correspondence between the candidate reference signal power parameters and the multiple groups of time-frequency resources. In this example, the second table may be a table pre-defined by the user terminal and pre-stored inside the user terminal. Alternatively, the second table may also be a table transmitted by the base station to the user terminal and stored by the user terminal. Alternatively, the second table may also be a table pre-stored in the user terminal by the manufacturer before the user terminal leaves the factory.

Figure 7A:
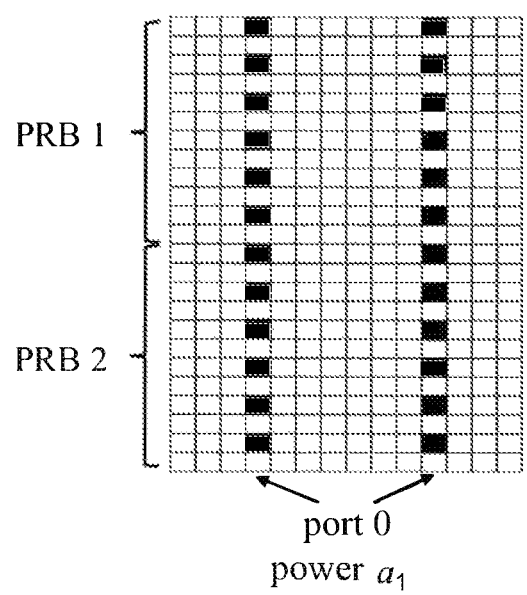
FIG. 7A is a schematic diagram of a reference signal power parameter selected by a user terminal in the prior art.
Figure 7B:
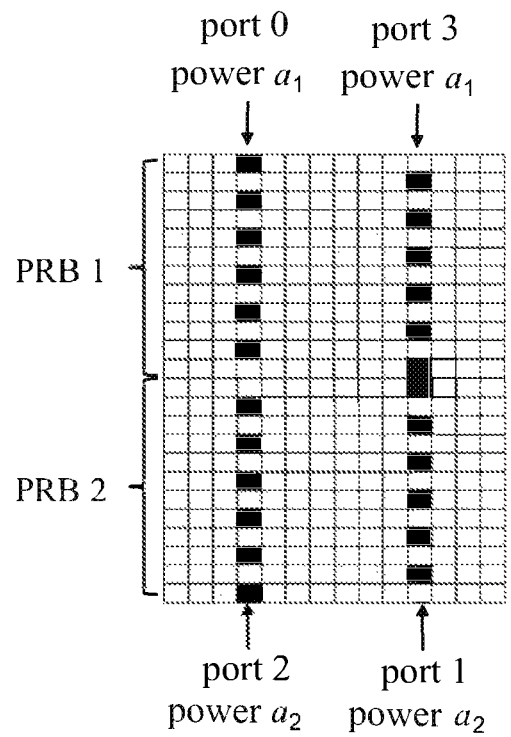
FIG. 7B is a schematic diagram of a reference signal power parameter selected by the user terminal for each group of time-frequency resources according to one embodiment of the present disclosure.

Schematic diagrams of reference signal power parameters selected by the user terminal will be described below in conjunction with FIG. 7A and FIG. 7B. FIG. 7A is a schematic diagram of a reference signal power parameter selected by a user terminal in the prior art. As shown in FIG. 7A, assuming that the number of PRBs for the user terminal is $L_1=2$ and the number of reference signal symbols for the user terminal is $L_2=2$ (that is, the fourth OFDM symbol and the eleventh OFDM symbol), the user terminal does not group the 2 PRBs and 2 reference signal symbols, and selects a common reference signal power parameter, that is, $a_1$, for the 2 PRBs and the 2 reference signal symbols. FIG. 7B is a schematic diagram of a reference signal power parameter selected by the user terminal for each group of time-frequency resources according to one embodiment of the present disclosure. As shown in FIG. 7B, assuming that the number of PRBs for the user terminal is $L_1=2$ and the number of reference signal symbols for the user terminal is $L_2=2$ (that is, the fourth OFDM symbol and the eleventh OFDM symbol), the user terminal divides the 2 PRBs and 2 reference signal symbols into 4 groups, each group includes 1 PRB and 1 reference signal symbol, and the user terminal selects reference signal power parameters, that is, $a_1$, $a_2$, $a_3$ and $a_4$, for the first group of PRB and reference signal symbol (that is, the first PRB and the fourth OFDM symbol), the second group of PRB and reference signal symbol (that is, the second PRB and the fourth OFDM symbol), the third group of PRB and reference signal symbol (that is, the first PRB and the eleventh OFDM symbol), and the fourth group of PRB and reference signal symbol (that is, the second PRB and the eleventh OFDM symbol), respectively. In this way, a transmitting side may distinguish different reference signals with different transmission powers, and accordingly a receiving side may detect each reference signal from a plurality of received reference signals.

Then, in step S202, the user terminal transmits reference signals by using the reference signal port corresponding to each group of time-frequency resources. For example, the user terminal may transmit reference signals by using the reference signal port corresponding to each group of time-frequency resources and with a transmission power indicated by the reference signal power parameter corresponding to each group of time-frequency resources. The reference signals mentioned herein may be the first-type reference signals, such as DMRSs.

For example, in the above example of FIG. 7B, the user terminal may transmit DMRS corresponding to the first group of PRB and reference signal symbol (that is, the first PRB and the fourth OFDM symbol) by using port 0 and a transmission power indicated by the reference signal power parameter $a_1$, DMRS corresponding to the second group of PRB and reference signal symbol (that is, the second PRB and the fourth OFDM symbol) by using port 2 and a transmission power indicated by the reference signal power parameter $a_2$, DMRS corresponding to the third group of PRB and reference signal symbol (that is, the first PRB and the eleventh OFDM symbol) by using port 3 and the transmission power indicated by the reference signal power parameter $a_1$, and DMRS corresponding to the fourth group of PRB and reference signal symbol (that is, the second PRB and the eleventh OFDM symbol) by using port 1 and the transmission power indicated by the reference signal power parameter $a_2$.

In addition, according to one example of the present disclosure, a probability of collision between reference signals of different user terminals in the communication system may be determined. For example, in the prior art, the probability of collision may be determined by using the following Formula (2):

$$Pr = 1 - C_{D_{original}}^{K} / D_{original}^{K} \qquad \text{Formula (2)}$$

where $D_{original}$ may be the number of candidate reference signal ports in the prior art, and K is the number of user terminals in the communication system. In the present disclosure, the above formula (2) may be transformed into the following Formula (3):

$$Pr = 1 - C_D^K / D^K \qquad \text{Formula (3)}$$

where $D = \emptyset_{i=1}^{M} D_i$, and $D_i = |D_i|$ is the number of elements in the candidate reference signal port set $D_i$ for the $S_i$-th group of time-frequency resources; $C_D^K$ is the number of cases where K reference signal ports are selected from D reference signal ports, and K is a positive integer. It can be seen from the above formulas (2) and (3) that the present disclosure extends the $D_{original}$ in the prior art to $D = \emptyset_{i=1}^{M} D_i$, thereby reducing the collision probability $P_r$.

With the method performed by the user terminal of this embodiment, the possibility of uplink reference signals configurable for each user terminal may be increased without extending reference signal ports, and the probability of collision between reference signals of different user terminals may be reduced.

In the above embodiment, the time-frequency resources for user terminals are divided into multiple groups, and reference signals are transmitted by using reference signal ports corresponding to respective groups of time-frequency resources, so as to reduce the probability of collision between reference signals of different user terminals. However, the present disclosure is not limited to thereto. According to another embodiment of the present disclosure, the time-frequency resources for user terminals may not be divided into multiple groups, and the probability of collision between reference signals of different user terminals is reduced by adjusting transmission powers of the reference signals.

Figure 8:
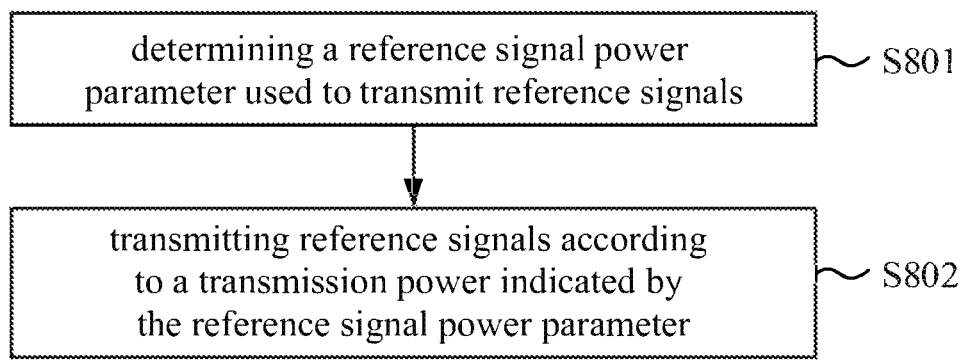
FIG. 8 is a flowchart of a method for transmitting reference signals performed by a user terminal in a communication system according to another embodiment of the present disclosure.

A method for transmitting reference signals performed by a user terminal in a communication system according to another embodiment of the present disclosure will be described below with reference to FIG. 8. FIG. 8 is a flowchart of a method 800 for transmitting reference signals performed by a user terminal in a communication system according to another embodiment of the present disclosure. Since some details of the method 800 is the same as the details of the method 200 described above with reference to FIG. 2, a detailed description of the same content is omitted herein for the sake of simplicity.

As shown in FIG. 8, in step S801, the user terminal determines a reference signal power parameter used to transmit reference signals. Then, in step S802, the user terminal transmits reference signals according to a transmission power indicated by the reference signal power parameter.

According to one example of the present disclosure, the user terminal may receive a reference signal power parameter from the base station. For example, the base station may set a reference signal power parameter for the user terminal, and notify the user terminal of the set reference signal power parameter through RRC signaling, DCI, MAC CEs and the like. Accordingly, the user terminal may determine a reference signal power parameter for transmitting reference signals by receiving RRC signaling, DCI, MAC CEs and the like from the base station.

According to another example of the present disclosure, the user terminal may preset a reference signal power parameter for transmitting reference signals without receiving it from the base station. For example, the user terminal may select a reference signal power parameter for transmitting reference signals from a predefined set of candidate reference signal power parameters. The set of candidate reference signal power parameters may be represented as P, which may have p elements, for example, $\{a_1, a_2, \ldots, a_p\}$, where p is a positive integer. The user terminal may select the reference signal power parameter for transmitting reference signals from the set of candidate reference signal power parameters.

Figure 9A:
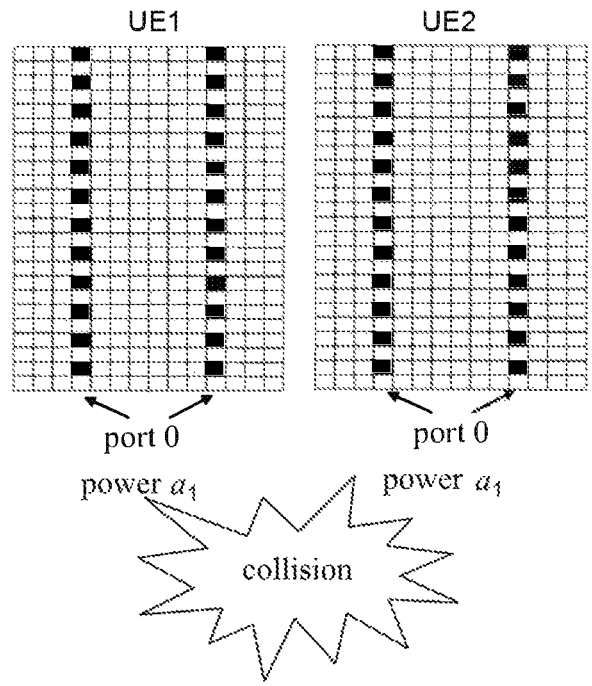
FIG. 9A is a schematic diagram of reference signal power parameters selected by different user terminals in the prior art.
Figure 9B:
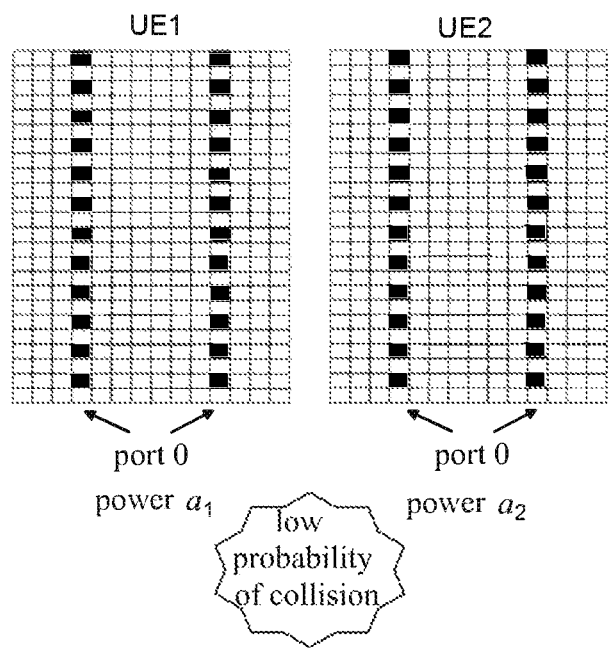
FIG. 9B is a schematic diagram of reference signal power parameters selected by different user terminals according to another embodiment of the present disclosure.

Schematic diagrams of reference signal power parameters selected by different user terminals will be described below in conjunction with FIG. 9A and FIG. 9B. FIG. 9A is a schematic diagram of reference signal power parameters selected by different user terminals in the prior art. As shown in FIG. 9A, both the first user terminal and the second user terminal use port 0 and the reference signal power parameter $a_1$ to transmit reference signals, which may cause collision between the reference signals. FIG. 9B is a schematic diagram of reference signal power parameters selected by different user terminals according to another embodiment of the present disclosure. As shown in FIG. 9B, although the first user terminal and the second user terminal both use port 0 to transmit reference signals, the first user terminal uses the reference signal power parameter $a_1$ and the second user terminal uses the reference signal power parameter az. In this way, the first user terminal and the second user terminal may use different transmission powers to transmit reference signals, so as to reduce the probability of collision between reference signals of the first user terminal and the second user terminal.

With the method performed by the user terminal in this embodiment, different user terminals may use different transmission powers to transmit reference signals, so that the base station may detect reference signals of each user terminal from the received multiple reference signals, thereby reducing the probability of collision between reference signals of different user terminals.

Figure 10:
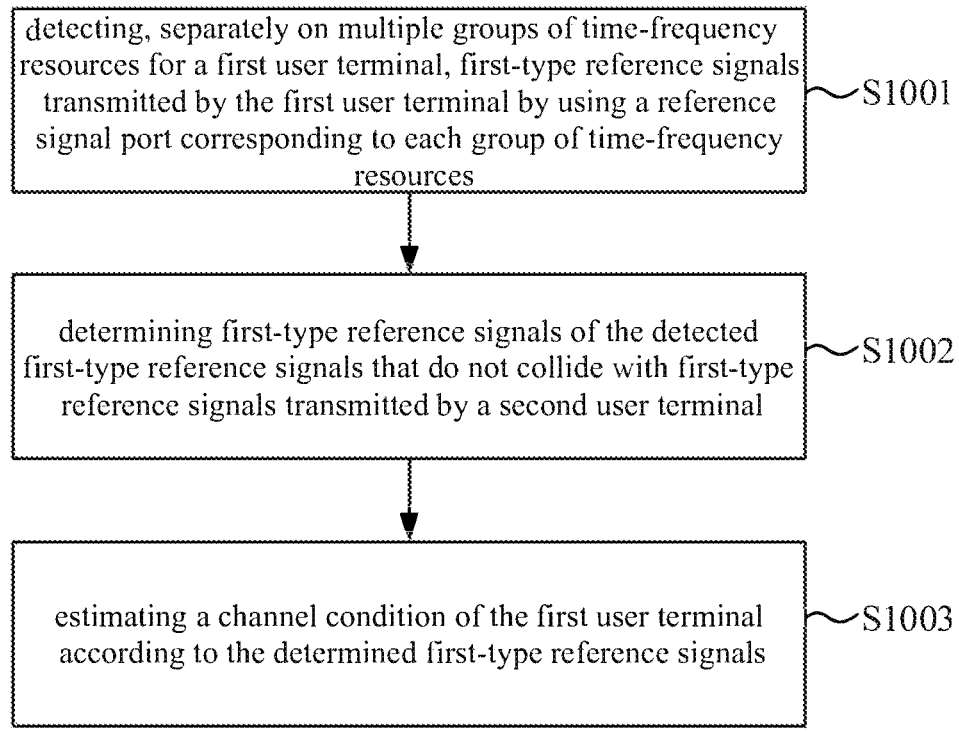
FIG. 10 is a flowchart of a method for receiving reference signals performed by a base station in a communication system according to one embodiment of the present disclosure.

A method for receiving reference signals performed by a base station in a communication system corresponding to the method 200 will be described below with reference to FIG. 10. FIG. 10 is a flowchart of a method 1000 for receiving reference signals performed by a base station in a communication system according to one embodiment of the present disclosure. Since some details of the method 1000 is the same as the details of the method 200 described above with reference to FIG. 2, a detailed description of the same content is omitted herein for the sake of simplicity. As shown in FIG. 10, in step S1001, the base station detects, separately on multiple groups of time-frequency resources for the first user terminal, first-type reference signals transmitted by the first user terminal by using reference signal ports corresponding to respective groups of time-frequency resources, where the time-frequency resources for the first user terminal are divided into the multiple groups of time-frequency resources.

According to one example of the present disclosure, the time-frequency resources for the user terminal may include physical resource blocks (PRBs) and reference signal symbols. In the present disclosure, the time-frequency resources for the user terminal may be divided into multiple groups of time-frequency resources in the frequency domain and/or the time domain, and one first-type reference signal is configured on each group of time-frequency resources, thereby configuring a plurality of first-type reference signals on the time-frequency resources for the user terminal being realized.

According to one example of the present disclosure, the time-frequency resources for the user terminal may be divided into multiple groups of time-frequency resources according to time-frequency resource division parameters. For example, the time-frequency resource division parameters may be time-frequency resource granularities used to select reference signal ports, and may be represented by N, where N is a positive integer. For the multiple groups of time-frequency resources for the user terminal, a time-frequency resource granularity for each group of time-frequency resources may be set separately. For example, time-frequency resource granularities for respective groups of time-frequency resources may be represented as $N_1, \ldots, N_m, \ldots, N_M$, where $1 \leq m \leq M$ and m is a positive integer. In the present disclosure, $N_1, \ldots, N_m, \ldots, N_M$ may be the same or different. In addition, the time-frequency resources for the user terminal may be divided into multiple groups of time-frequency resources according to the above following Formula (1).

In this example, the time-frequency resources for the user terminal may be divided into multiple groups of time-frequency resources in the frequency domain and/or the time domain according to the time-frequency resource division parameters. For example, the time-frequency resources for the user terminal may be divided into multiple groups of time-frequency resources in the frequency domain according to the time-frequency resource division parameters. In this case, the time-frequency resource division parameters may be PRB granularities used to select reference signal ports, that is, the user terminal may divide PRBs for the user terminal into multiple groups of PRBs according to the time-frequency resource division parameters. L in the above Formula (1) may be the number of PRBs for the user terminal, that is, L PRBs for the user terminal are divided into M groups of PRBs.

For another example, the time-frequency resources for the user terminal may be divided into multiple groups of time-frequency resources in the time domain according to the time-frequency resource division parameters. In this case, the time-frequency resource division parameters may be symbol granularities used to select reference signal ports, that is, the user terminal may divide reference signal symbols for the user terminal into multiple groups of reference signal symbols according to the time-frequency resource division parameters. The reference signal symbols may be Orthogonal Frequency Division Multiplexing (OFDM) symbols used to transmit reference signals. L in the above Formula (1) may be the number of reference signal symbols for the user terminal, that is, L reference signal symbols for the user terminal are divided into M groups of reference signal symbols.

It should be appreciated that the time-frequency resources for the user terminal may also be divided into multiple groups of time-frequency resources in the frequency domain and the time domain according to the time-frequency resource division parameters. For example, $L_1$ PRBs and $L_2$ reference signal symbols for the user terminal may be divided into M groups, and the number of PRBs or reference signal symbols included in each group may be the same or different, where $L_1$ and $L_2$ are both positive integers.

In addition, according to one example of the present disclosure, the base station may transmit the time-frequency resource division parameters to the user terminal. For example, the base station may set the time-frequency resource division parameters for the user terminal, and notify the user terminal of the set time-frequency resource division parameters by using Radio Resource Control (RRC) signaling, Downlink Control Information (DCI), Media Access Control (MAC) Control Elements (CEs) and the like. Accordingly, the user terminal may divide the time-frequency resources for the user terminal into multiple groups of time-frequency resources according to the received time-frequency resource division parameters.

In addition, according to one example of the present disclosure, a value of the time-frequency resource division parameters may be fixed, for example, N=1 or 2. Alternatively, the value of the time-frequency resource division parameters may also be dynamically changed. For example, when the number of user terminals in the communication system is large, the value of the time-frequency resource division parameters may be reduced; when the number of user terminals in the communication system is small, the value of the time-frequency resource division parameters may be increased. For example, when the number of user terminals in the communication system exceeds a threshold, the value of the time-frequency resource division parameters may be set to 1, that is, N=1; when the number of user terminals in the communication system is equal with or smaller than the threshold, the value of the time-frequency resource division parameters may be set to 2, that is, N=2.

In addition, according to one example of the present disclosure, before step S1001, the base station may determine an identification of the first user terminal. For example, the base station may determine the identification of the first user terminal through a preamble or other uplink reference signals transmitted by the user terminal.

In addition, according to another example of the present disclosure, in step S1001, the base station may determine an identification of the first user terminal. For example, the base station may detect, on a first group of time-frequency resources for the first user terminal, DMRS transmitted by the first user terminal by using a reference signal port corresponding to the first group of time-frequency resources; and then, detect, on a second group of time-frequency resources for the first user terminal and by using the detected DMRS corresponding to the first group of time-frequency resources, DMRS transmitted by the first user terminal by using a reference signal port corresponding to the second group of time-frequency resources; and so on, until the base station detects, on all groups of time-frequency resources for the first user terminal, DMRSs transmitted by the first user terminal by using reference signal ports corresponding to respective groups of time-frequency resources, so as to determine the identification of the first user terminal.

Then, in step S1002, the base station determines first-type reference signals of the detected multiple first-type reference signals that do not collide with first-type reference signals transmitted by the second user terminal. For example, user terminals simultaneously served by the base station may include a first user terminal and a second user terminal. Then, in step S1002, the base station may determine whether multiple DMRSs transmitted by the first user terminal collide with one or more DMRSs transmitted by the second user terminal, thereby determining DMRSs of the multiple DMRSs transmitted by the first user terminal that do not collide with the DMRSs transmitted by the second user terminal.

It should be appreciated that although the user terminals simultaneously served by the base station include two user terminals in the above example, the present disclosure is not limited thereto. According to another example of the present disclosure, the number of user terminals simultaneously served by the base station may be more than two. In this case, in step S1002, the base station may determine first-type reference signals of the detected multiple first-type reference signals that do not collide with first-type reference signals transmitted by other user terminals.

Then, in step S1003, the base station estimates a channel condition of the first user terminal according to the determined first-type reference signals. For example, the base station may estimate channel conditions of one or more groups of time-frequency resources corresponding to the determined first-type reference signals according to the determined first-type reference signals, and infer channel conditions of other groups of time-frequency resources for the user terminal according to the determined channel conditions.

With the method performed by the base station in this embodiment, the possibility of uplink reference signals configurable for each user terminal may be increased without extending reference signal ports, and the probability of collision between reference signals of different user terminals may be reduced. Moreover, even when collision occurs between a part of reference signals of different user terminals, the base station can still estimate a channel condition of each user terminal through reference signals without collision.

Figure 11:
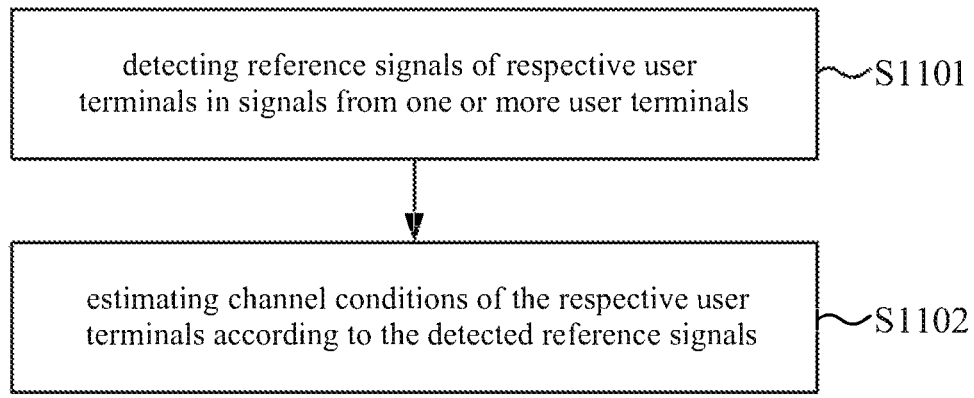
FIG. 11 is a flowchart of a method for receiving reference signals performed by a base station in a communication system according to another embodiment of the present disclosure.

A method for receiving reference signals performed by a base station in a communication system corresponding to the method 800 will be described below with reference to FIG. 11. FIG. 11 is a flowchart of a method 1100 for receiving reference signals performed by a base station in a communication system according to another embodiment of the present disclosure. Since some details of the method 1100 is the same as the details of the method 800 described above with reference to FIG. 8, a detailed description of the same content is omitted here for the sake of simplicity. As shown in FIG. 11, in step S1101, the base station detects reference signals of respective user terminals in signals from one or more user terminals, where the reference signals of the respective user terminals are transmitted by the respective user terminals according to reference signal power parameters used to transmit reference signals.

According to one example of the present disclosure, the base station may transmit a reference signal power parameter to the user terminal. For example, the base station may set a reference signal power parameter for the user terminal, and notify the user terminal of the set reference signal power parameter through RRC signaling, DCI, MAC CEs and the like. Accordingly, the user terminal may determine a reference signal power parameter for transmitting reference signals by receiving RRC signaling, DCI, MAC CEs and the like from the base station, and transmit reference signals by using a transmission power indicated by the determined reference signal power parameter.

In this example, since respective user terminals may use different transmission powers to transmit reference signals, the base station may detect reference signals of the respective user terminal in signals from one or more user terminals by means of successive interference cancellation. For example, the base station may detect, in the signals from one or more user terminals, reference signals transmitted by a user terminal using the largest transmission power, and reference signals transmitted by a user terminal using the second largest transmission power, and so on, until reference signals transmitted by a user terminal using the smallest transmission power are detected.

Then, in step S1102, the base station estimates channel conditions of the respective user terminals according to the detected reference signals. For example, the base station may estimate channel conditions corresponding to time-frequency resources used for the respective user terminal according to the detected reference signals.

With the method performed by the base station in this embodiment, different user terminals may use different transmission powers to transmit reference signals, so that the base station may detect reference signals of each user terminal from the multiple received reference signals, thereby reducing the probability of collision between reference signals of different user terminals.

Figure 12:
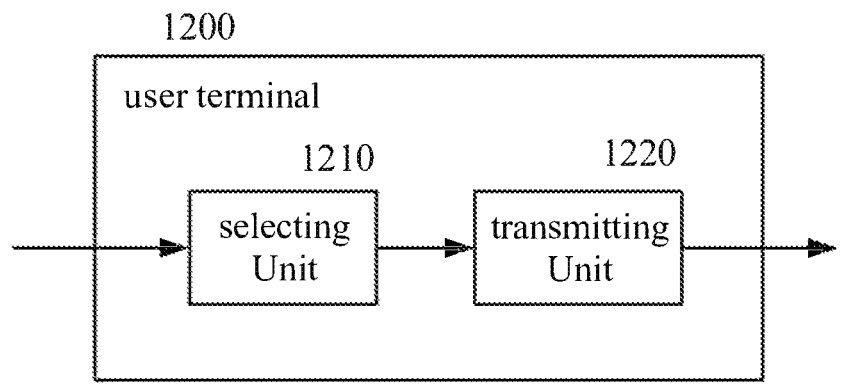
FIG. 12 is a schematic structural diagram of a user terminal that performs the method shown in FIG. 2 according to one embodiment of the present disclosure.

A user terminal 1200 performing the method 200 according to one embodiment of the present disclosure will be described below with reference to FIG. 12. FIG. 12 is a schematic structural diagram of a user terminal 1200 according to one embodiment of the present disclosure. Since functions of the user terminal 1200 are the same as the details of the method described above with reference to FIG. 2, a detailed description of the same content is omitted herein for the sake of simplicity. As shown in FIG. 12, the user terminal 1200 includes: a selecting unit 1210 configured to select a reference signal port for each group of time-frequency resources from candidate reference signal ports; and a transmitting unit 1220 configured to transmit reference signals by using a reference signal port corresponding to each group of time-frequency resources. In addition to these two units, the user terminal 1200 may further include other components. However, since these components are irrelevant with the content of the embodiments of the present disclosure, their illustrations and descriptions are omitted herein.

In the present disclosure, time-frequency resources for the user terminal may be divided into multiple groups of time-frequency resources. For example, the time-frequency resources for the user terminal may be divided into M groups of time-frequency resources, and the M groups of time-frequency resources may be represented as $S_1, S_2, \ldots, S_M$, where M is a positive integer.

According to one example of the present disclosure, the selecting unit 1210 may divide the time-frequency resources for the user terminal into multiple groups of time-frequency resources according to time-frequency resource division parameters. For example, the time-frequency resource division parameters may be time-frequency resource granularities used to select reference signal ports, and may be represented by N, where N is a positive integer. For multiple groups of time-frequency resources for the user terminal, a time-frequency resource granularity for each group of time-frequency resources may be set separately. For example, time-frequency resource granularities for respective groups of time-frequency resources may be represented as $N_1, \ldots, N_m, \ldots, N_M$, where $1 \leq m \leq M$ and m is a positive integer. In the present disclosure, $N_1, \ldots, N_m, \ldots, N_M$ may be the same or different. In addition, the time-frequency resources for the user terminal may be divided into multiple groups of time-frequency resources according to the above Formula (1).

In this example, the selecting unit 1210 may divide the time-frequency resources for the user terminal into multiple groups of time-frequency resources in the frequency domain and/or the time domain according to the time-frequency resource division parameters. For example, the user terminal may divide the time-frequency resources for the user terminal into multiple groups of time-frequency resources in the frequency domain according to the time-frequency resource division parameters. In this case, the time-frequency resource division parameters may be PRB granularities used to select reference signal ports, that is, the user terminal may divide PRBs for the user terminal into multiple groups of PRBs according to the time-frequency resource division parameters. L in the above Formula (1) may be the number of PRBs for the user terminal, that is, L PRBs for the user terminal are divided into M groups of PRBs.

For another example, the selecting unit 1210 may divide the time-frequency resources for the user terminal into multiple groups of time-frequency resources in the time domain according to the time-frequency resource division parameters. In this case, the time-frequency resource division parameters may be symbol granularities used to select reference signal ports, that is, the user terminal may divide reference signal symbols for the user terminal into multiple groups of reference signal symbols according to the time-frequency resource division parameters. The reference signal symbols may be Orthogonal Frequency Division Multiplexing (OFDM) symbols used to transmit reference signals. L in the above Formula (1) may be the number of reference signal symbols for the user terminal, that is, L reference signal symbols for the user terminal are divided into M groups of reference signal symbols. In addition, in a single-symbol DMRS system, L reference signal symbols may correspond to L OFDM symbols. In a multi-symbol DMRS system, L reference signal symbols may correspond to more than L OFDM symbols. For example, in a dual-symbol DMRS system, L reference signal symbols may correspond to 2L OFDM symbols.

It should be appreciated that the selecting unit 1210 may also divide the time-frequency resources for the user terminal into multiple groups of time-frequency resources in the frequency domain and the time domain according to the time-frequency resource division parameters. For example, $L_1$ PRBs and $L_2$ reference signal symbols for the user terminal may be divided into M groups, and the number of PRBs or reference signal symbols included in each group may be the same or different, where $L_1$ and $L_2$ are both positive integers.

In addition, according to one example of the present disclosure, the user terminal 1200 may further include a receiving unit (not illustrated in the figure) configured to receive frequency resource division parameters from the base station. For example, the base station may set the time-frequency resource division parameters for the user terminal, and notify the user terminal of the set time-frequency resource division parameters by using Radio Resource Control (RRC) signaling, Downlink Control Information (DCI), Media Access Control (MAC) Control Elements (CEs) and the like. Accordingly, the user terminal may divide the time-frequency resources for the user terminal into multiple groups of time-frequency resources according to the received time-frequency resource division parameters.

According to another example of the present disclosure, the time-frequency resource division parameters may also be preset by the user terminal, and does not need to be received from the base station. For example, the user terminal presets the time-frequency resource division parameters according to channel conditions or service conditions, and divides the time-frequency resources for the user terminal into multiple groups of time-frequency resources according to the preset time-frequency resource division parameters.

In addition, according to one example of the present disclosure, candidate reference signal ports may constitute one or more sets of candidate reference signal ports. For example, each set of candidate reference signal ports may include at least reference signal ports corresponding to first-subtype reference signals of the first-type reference signals. In the present disclosure, the first-subtype reference signals and second-subtype reference signals are both the first-type reference signals, but the first-subtype reference signals and the second-subtype reference signals have different patterns, sequences, ports, and so on.

In an example, in the case that candidate reference signal ports constitute multiple sets of candidate reference signal ports, the multiple sets of candidate reference signal ports may correspond to multiple groups of time-frequency resources. Specifically, when the time-frequency resources for the user terminal are divided into M groups of time-frequency resources (i.e., $S_1, S_2, \ldots, S_M$), the candidate reference signal ports may constitute M sets of candidate reference signal ports, which, for example, may be represented as $D_1, D_2, \ldots, D_M$, and $D_1, D_2, \ldots, D_M$, correspond to $S_1, S_2, \ldots, S_M$ respectively. In this example, the selecting unit 1210 may select a reference signal port for each group of time-frequency resources from each set of candidate reference signal ports.

In this example, in the case that the candidate reference signal ports constitute one set of candidate reference signal ports, the selecting unit 1210 may select a reference signal port for each group of time-frequency resources from this set of candidate reference signal ports. For example, some or all of the candidate reference signal ports may constitute one set of candidate reference signal ports.

For example, the selecting unit 1210 may select a reference signal port for a first group of time-frequency resources from a first set of candidate reference signal ports. For example, the first set of candidate reference signal ports may be one candidate reference signal port set constituted by candidate reference signal ports, and may be represented by $D_0$. The first set of candidate reference signal ports may have k elements, that is, k candidate reference signal ports, which may be represented as $D_0=\{0, 1, 2, \ldots, (k-1)\}$, where $0 \le i < k$, and i is a integer and k is a positive integer.

Then, the selecting unit 1210 may determine, from the first set of candidate reference signal ports, reference signal ports for other groups of time-frequency resources of the multiple groups of time-frequency resources, according to the selected reference signal port for the first group of time-frequency resources and a reference signal port offset parameter.

In this example, the selecting unit of the user terminal may further be configured to receive the reference signal port offset parameter from the base station. For example, the base station may set the reference signal port offset parameter for the user terminal, and notify the user terminal of the set reference signal port offset parameter through RRC signaling, DCI, MAC CEs and the like. Accordingly, the user terminal may determine the reference signal ports for other groups of time-frequency resources of the multiple groups of time-frequency resources, according to the received reference signal port offset parameter and the reference signal port for the first group of time-frequency resources.

According to another example of the present disclosure, the reference signal port offset parameter may also be preset by the user terminal, and does not need to be received from the base station. For example, the user terminal presets the reference signal port offset parameter according to channel conditions or service conditions, and determines the reference signal ports for other groups of time-frequency resources of the multiple groups of time-frequency resources, according to the preset reference signal port offset parameter and the reference signal port for the first group of time-frequency resources.

Furthermore, according to one example of the present disclosure, the selecting unit 1210 may randomly select a reference signal port for each group of time-frequency resources from the candidate reference signal ports. For example, reference signal ports for respective groups of time-frequency resources may be completely different, or may be partially the same.

Furthermore, according to another example of the present disclosure, the selecting unit 1210 may select a reference signal port for each group of time-frequency resources in a first table, and the first table may include candidate reference signal ports and correspondence between candidate reference signal ports and multiple groups of time-frequency resources. In this example, the first table may be a table pre-defined by the user terminal and pre-stored inside the user terminal. Alternatively, the first table may also be a table transmitted by the base station to the user terminal and stored by the user terminal. Alternatively, the first table may also be a table pre-stored in the user terminal by the manufacturer before the user terminal leaves the factory.

In addition, the user terminal 1200 may further include a determining unit (not illustrated in the figure) configured to determine a reference signal power parameter for each group of time-frequency resources. For example, the reference signal power parameter may be a power boosting parameter used to transmit reference signals.

According to one example of the present disclosure, the receiving unit of the user terminal may receive one or more reference signal power parameters from the base station. For example, the base station may set one or more reference signal power parameters for the user terminal, and notify the user terminal of the set reference signal power parameters through RRC signaling, DCI, MAC CEs and the like. Accordingly, the user terminal may determine the reference signal power parameter for each group of time-frequency resources by receiving RRC signaling, DCI, MAC CEs and the like from the base station.

According to another example of the present disclosure, the user terminal may preset a reference signal power parameter for each group of time-frequency resources without receiving it from the base station. For example, the user terminal may select a reference signal power parameter for each group of time-frequency resources from a predefined set of candidate reference signal power parameters. The set of candidate reference signal power parameters may be represented as P, which may have p elements, for example, $\{a_1, a_2, \ldots, a_p\}$, where p is a positive integer. The user terminal may select the reference signal power parameter for each group of time-frequency resources from the set of candidate reference signal power parameters.

In addition, according to one example of the present disclosure, the transmitting unit 1220 may transmits reference signals by using the reference signal port corresponding to each group of time-frequency resources and with a transmission power indicated by the reference signal power parameter corresponding to each group of time-frequency resources. The reference signals mentioned herein may be the first-type reference signals, such as DMRSs.

With the user terminal of this embodiment, the possibility of uplink reference signals configurable for each user terminal may be increased without extending reference signal ports, and the probability of collision between reference signals of different user terminals may be reduced.

Figure 13:
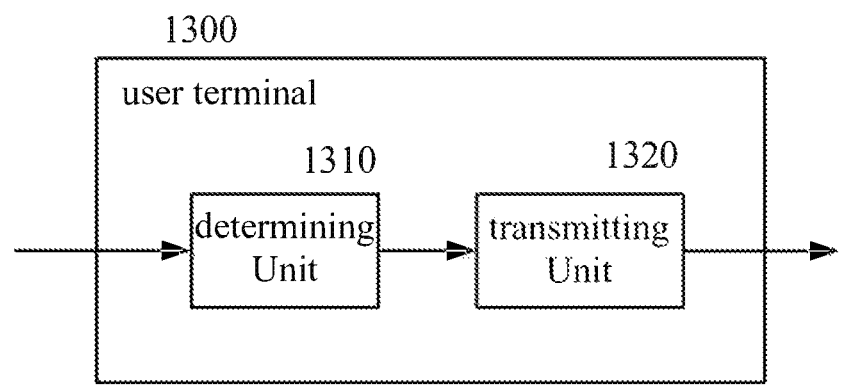
FIG. 13 is a schematic structural diagram of a user terminal that performs the method shown in FIG. 8 according to another embodiment of the present disclosure.

A user terminal performing the method 800 according to one embodiment of the present disclosure will be described below with reference to FIG. 13. FIG. 13 is a schematic structural diagram of a user terminal 1300 according to another embodiment of the present disclosure. Since functions of the user terminal 1300 are the same as the details of the method described above with reference to FIG. 8, a detailed description of the same content is omitted herein for the sake of simplicity. As shown in FIG. 13, the user terminal 1300 includes: a determining unit 1310 configured to determine a reference signal power parameter used to transmit reference signals; and a transmitting unit 1320 configured to transmit reference signals according to a transmission power indicated by the reference signal power parameter. In addition to these two units, the user terminal 1300 may further include other components. However, since these components are irrelevant with the content of the embodiments of the present disclosure, their illustrations and descriptions are omitted herein.

According to one example of the present disclosure, the user terminal 1300 may further include a receiving unit (not illustrated in the figure) configured to receive a reference signal power parameter from the base station. For example, the base station may set a reference signal power parameter for the user terminal, and notify the user terminal of the set reference signal power parameter through RRC signaling, DCI, MAC CEs and the like. Accordingly, the user terminal may determine the reference signal power parameter for transmitting reference signals by receiving RRC signaling, DCI, MAC CEs and the like from the base station.

According to another example of the present disclosure, the user terminal may preset a reference signal power parameter for transmitting reference signals without receiving it from the base station. For example, the user terminal may select a reference signal power parameter for transmitting reference signals from a predefined set of candidate reference signal power parameters. The set of candidate reference signal power parameters may be represented as P, which may have p elements, for example, $\{a_1, a_2, \ldots, a_p\}$, where p is a positive integer. The user terminal may select the reference signal power parameter for transmitting reference signals from the set of candidate reference signal power parameters.

With the user terminal in this embodiment, different user terminals may use different transmission powers to transmit reference signals, so that the base station may detect reference signals of each user terminal from the received multiple reference signals, thereby reducing the probability of collision between reference signals of different user terminals.

Figure 14:
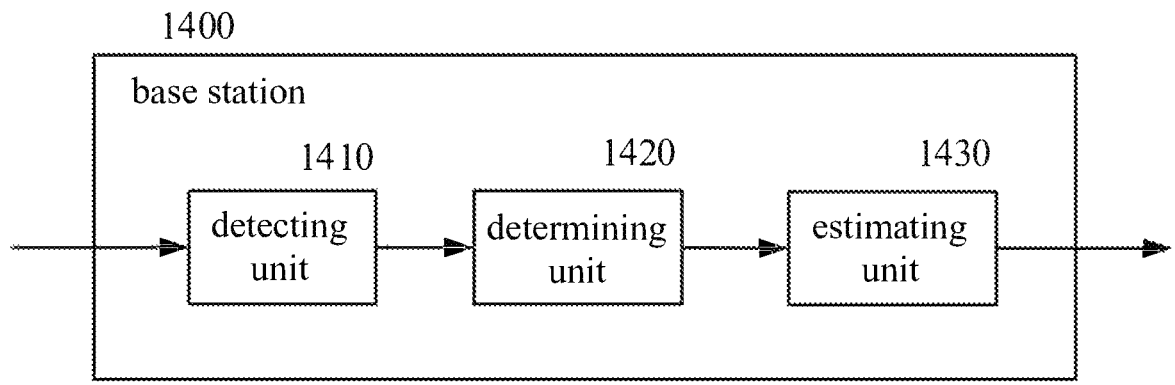
FIG. 14 is a schematic structural diagram of a base station that performs the method shown in FIG. 10 according to one embodiment of the present disclosure.

A base station performing the method 1000 according to one embodiment of the present disclosure will be described below with reference to FIG. 14. FIG. 14 is a schematic structural diagram of a base station 1400 according to one embodiment of the present disclosure. Since functions of the base station 1400 are the same as the details of the method described above with reference to FIG. 10, a detailed description of the same content is omitted herein for the sake of simplicity. As shown in FIG. 14, the base station 1400 includes: a detecting unit 1410 configured to detect, separately on multiple groups of time-frequency resources for the first user terminal, first-type reference signals transmitted by the first user terminal by using reference signal ports corresponding to respective groups of time-frequency resources, where the time-frequency resources for the first user terminal are divided into the multiple groups of time-frequency resources; a determining unit 1420 configured to determine first-type reference signals of the detected multiple first-type reference signals that do not collide with first-type reference signals transmitted by a second user terminal; and an estimating unit 1430 configured to estimate a channel condition of the first user terminal according to the determined first-type reference signals. In addition to these three units, the base station 1400 may further include other components. However, since these components are irrelevant with the content of the embodiments of the present disclosure, their illustrations and descriptions are omitted herein.

According to one example of the present disclosure, the time-frequency resources for the user terminal may include physical resource blocks (PRBs) and reference signal symbols. In the present disclosure, the time-frequency resources for the user terminal may be divided into multiple groups of time-frequency resources in the frequency domain and/or the time domain, and one first-type reference signal is configured on each group of time-frequency resources, thereby configuring a plurality of first-type reference signals on the time-frequency resources for the user terminal being realized.

According to one example of the present disclosure, the time-frequency resources for the user terminal may be divided into multiple groups of time-frequency resources according to time-frequency resource division parameters. For example, the time-frequency resource division parameters may be time-frequency resource granularities used to select reference signal ports, and may be represented by N, where N is a positive integer. For the multiple groups of time-frequency resources for the user terminal, a time-frequency resource granularity for each group of time-frequency resources may be set separately. For example, time-frequency resource granularities for respective groups of time-frequency resources may be represented as $N_1, \ldots, N_m, \ldots, N_M$, where $1 \leq m \leq M$ and m is a positive integer. In the present disclosure, $N_1, \ldots, N_m, \ldots, N_M$ may be the same or different. In addition, the time-frequency resources for the user terminal may be divided into multiple groups of time-frequency resources according to the above following Formula (1).

In this example, the time-frequency resources for the user terminal may be divided into multiple groups of time-frequency resources in the frequency domain and/or the time domain according to the time-frequency resource division parameters. For example, the time-frequency resources for the user terminal may be divided into multiple groups of time-frequency resources in the frequency domain according to the time-frequency resource division parameters. In this case, the time-frequency resource division parameters may be PRB granularities used to select reference signal ports, that is, the user terminal may divide PRBs for the user terminal into multiple groups of PRBs according to the time-frequency resource division parameters. L in the above Formula (1) may be the number of PRBs for the user terminal, that is, L PRBs for the user terminal are divided into M groups of PRBs.

For another example, the time-frequency resources for the user terminal may be divided into multiple groups of time-frequency resources in the time domain according to the time-frequency resource division parameters. In this case, the time-frequency resource division parameters may be symbol granularities used to select reference signal ports, that is, the user terminal may divide reference signal symbols for the user terminal into multiple groups of reference signal symbols according to the time-frequency resource division parameters. The reference signal symbols may be Orthogonal Frequency Division Multiplexing (OFDM) symbols used to transmit reference signals. L in the above Formula (1) may be the number of reference signal symbols for the user terminal, that is, L reference signal symbols for the user terminal are divided into M groups of reference signal symbols.

It should be appreciated that the time-frequency resources for the user terminal may also be divided into multiple groups of time-frequency resources in the frequency domain and the time domain according to the time-frequency resource division parameters. For example, $L_1$ PRBs and $L_2$ reference signal symbols for the user terminal may be divided into M groups, and the number of PRBs or reference signal symbols included in each group may be the same or different, where $L_1$ and $L_2$ are both positive integers.

In addition, according to one example of the present disclosure, the base station 1400 may further include a transmitting unit (not illustrated in the figure) configured to transmit the time-frequency resource division parameters to the user terminal. For example, the base station may set the time-frequency resource division parameters for the user terminal, and notify the user terminal of the set time-frequency resource division parameters by using Radio Resource Control (RRC) signaling, Downlink Control Information (DCI), Media Access Control (MAC) Control Elements (CEs) and the like. Accordingly, the user terminal may divide the time-frequency resources for the user terminal into multiple groups of time-frequency resources according to the received time-frequency resource division parameters.

In addition, according to one example of the present disclosure, a value of the time-frequency resource division parameters may be fixed, for example, N=1 or 2. Alternatively, the value of the time-frequency resource division parameters may also be dynamically changed. For example, when the number of user terminals in the communication system is large, the base station may reduce the value of the time-frequency resource division parameters; when the number of user terminals in the communication system is small, the base station may increase the value of the time-frequency resource division parameters. For example, when the number of user terminals in the communication system exceeds a threshold, the value of the time-frequency resource division parameters may be set to 1, that is, N=1; when the number of user terminals in the communication system is equal with or smaller than the threshold, the value of the time-frequency resource division parameters may be set to 2, that is, N=2.

In addition, according to one example of the present disclosure, the determining unit 1420 may be configured to determine an identification of the first user terminal. For example, the base station may determine the identification of the first user terminal through a preamble or other uplink reference signals transmitted by the user terminal.

In addition, according to another example of the present disclosure, the determining unit 1420 may be configured to determine an identification of a first user terminal. For example, the base station may detect, on a first group of time-frequency resources for the first user terminal, DMRS transmitted by the first user terminal by using a reference signal port corresponding to the first group of time-frequency resources; and then, detect, on a second group of time-frequency resources for the first user terminal and by using the detected DMRS corresponding to the first group of time-frequency resources, DMRS transmitted by the first user terminal by using a reference signal port corresponding to the second group of time-frequency resources; and so on, until the base station detects, on all groups of time-frequency resources for the first user terminal, DMRSs transmitted by the first user terminal by using reference signal ports corresponding to respective groups of time-frequency resources, so as to determine the identification of the first user terminal.

In addition, according to one example of the present disclosure, user terminals simultaneously served by the base station may include a first user terminal and a second user terminal. Then, the determining unit 1420 may determine whether multiple DMRSs transmitted by the first user terminal collide with one or more DMRSs transmitted by the second user terminal, thereby determining DMRSs of the multiple DMRSs transmitted by the first user terminal that do not collide with the DMRSs transmitted by the second user terminal.

It should be appreciated that although the user terminals simultaneously served by the base station include two user terminals in the above example, the present disclosure is not limited thereto. According to another example of the present disclosure, the number of user terminals simultaneously served by the base station may be more than two. In this case, the determining unit 1420 may determine first-type reference signals of the detected multiple first-type reference signals that do not collide with first-type reference signals transmitted by other user terminals.

In addition, according to one example of the present disclosure, the estimating unit 1430 may estimate channel conditions of one or more groups of time-frequency resources corresponding to the determined first-type reference signals according to the determined first-type reference signals, and infer channel conditions of other groups of time-frequency resources for the user terminal according to the determined channel conditions.

With the base station in this embodiment, the possibility of uplink reference signals configurable for each user terminal may be increased without extending reference signal ports, and the probability of collision between reference signals of different user terminals may be reduced. Moreover, even when collision occurs between a part of reference signals of different user terminals, the base station can still estimate a channel condition of each user terminal through reference signals without collision.

Figure 15:
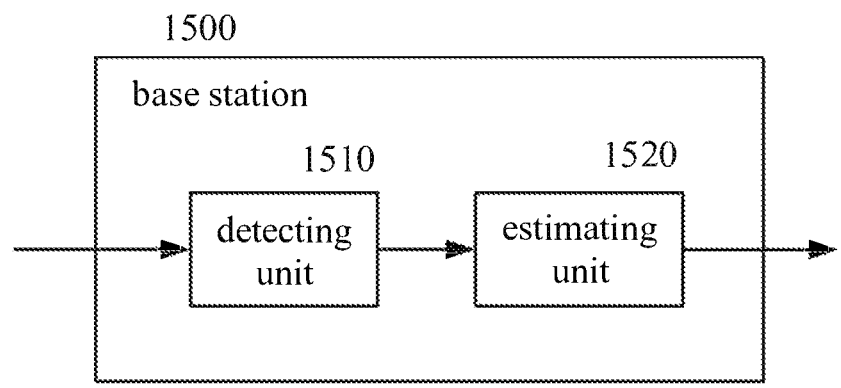
FIG. 15 is a schematic structural diagram of a base station that performs the method shown in FIG. 11 according to another embodiment of the present disclosure.

A base station performing the method 1100 according to one embodiment of the present disclosure will be described below with reference to FIG. 15. FIG. 15 is a schematic structural diagram of a base station 1500 according to another embodiment of the present disclosure. Since functions of the base station 1500 are the same as the details of the method described above with reference to FIG. 11, a detailed description of the same content is omitted herein for the sake of simplicity. As shown in FIG. 15, the base station 1400 includes: a detecting unit 1510 configured to detect reference signals of respective user terminals in signals from one or more user terminals, where the reference signals of the respective user terminals are transmitted by the respective user terminals according to reference signal power parameters used to transmit reference signals; and an estimating unit 1520 configured to estimate channel conditions of the respective user terminals according to the detected reference signals. In addition to these two units, the base station 1500 may further include other components. However, since these components are irrelevant with the content of the embodiments of the present disclosure, their illustrations and descriptions are omitted herein.

According to one example of the present disclosure, the base station 1500 may further include a transmitting unit (not illustrated in the figure) configured to transmit a reference signal power parameter to the user terminal. For example, the base station may set a reference signal power parameter for the user terminal, and notify the user terminal of the set reference signal power parameters through RRC signaling, DCI, MAC CEs and the like. Accordingly, the user terminal may determine a reference signal power parameter for transmitting reference signals by receiving RRC signaling, DCI, MAC CEs and the like from the base station, and transmit reference signals by using a transmission power indicated by the determined reference signal power parameter.

In this example, since respective user terminals may use different transmission powers to transmit reference signals, the base station may detect reference signals of the respective user terminal in signals from one or more user terminals by means of successive interference cancellation. For example, the base station may detect, in the signals from one or more user terminals, reference signals transmitted by a user terminal using the largest transmission power, and reference signals transmitted by a user terminal using the second largest transmission power, and so on, until reference signals transmitted by a user terminal using the smallest transmission power are detected.

With the base station in this embodiment, different user terminals may use different transmission powers to transmit reference signals, so that the base station may detect reference signals of each user terminal from the multiple received reference signals, thereby reducing the probability of collision between reference signals of different user terminals.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. via wire and/or wireless), and the respective functional blocks may be implemented by these apparatuses.

Figure 16:
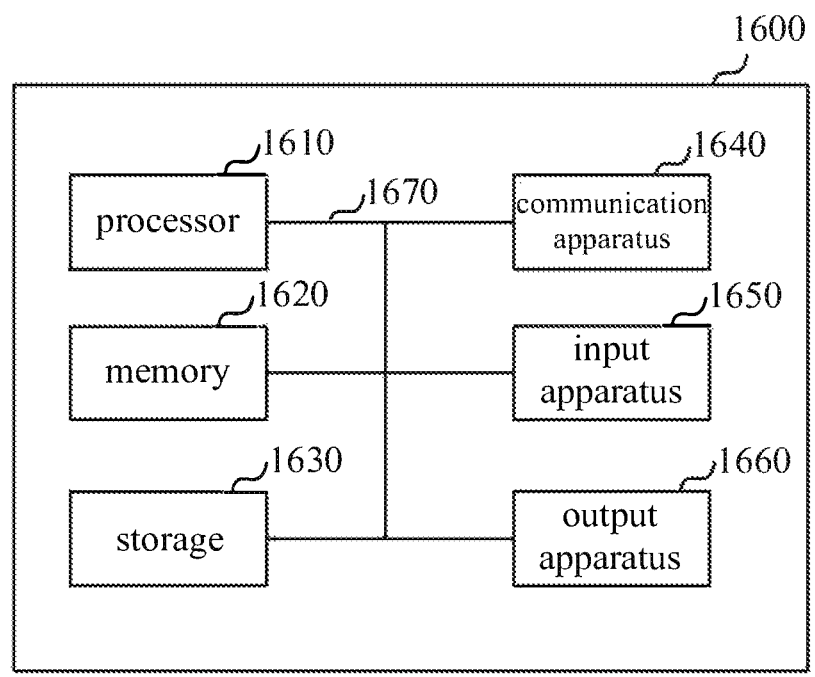
FIG. 16 is a schematic diagram of a hardware structure of a user terminal or a base station involved according to embodiments of the present disclosure.

For example, a device (for example, the base station, the user terminal and the like) in one embodiment of the present disclosure may function as a computer that executes the processes of the wireless communication method of the present disclosure. FIG. 16 is a diagram illustrating an example of a hardware structure of a device 1600 involved in one embodiment of the present disclosure. The device 1600 described above (the base station or the user terminal) may be constituted as a computer apparatus that physically comprises a processor 1610, a memory 1620, a storage 1630, a communication apparatus 1640, an input apparatus 1650, an output apparatus 1660, a bus 1670 and the like.

In addition, in the following description, terms such as "apparatus" may be replaced with circuits, devices, units, and the like. The hardware structure of the user terminal and the base station may include one or more of the respective apparatuses shown in the figure, or may not include a part of the apparatuses.

For example, only one processor 1610 is illustrated, but there may be a plurality of processors. Furthermore, processes may be performed by one processor, or processes may be performed by more than one processor simultaneously, sequentially, or by other methods. In addition, the processor 1610 may be installed by more than one chip.

Respective functions of the device 1600 may be implemented, for example, by reading specified software (program) onto hardware such as the processor 1610 and the memory 1620, so that the processor 1610 performs computations, controls communication performed by the communication apparatus 1640, and controls reading and/or writing of data in the memory 1620 and the storage 1630.

The processor 1610, for example, operates an operating system to control the entire computer. The processor 1610 may be constituted by a Central Processing Unit (CPU), which includes interfaces with peripheral apparatuses, a control apparatus, a computing apparatus, a register and the like. For example, the determining unit, the selecting unit and the like described above may be implemented by the processor 1610.

In addition, the processor 1610 reads programs (program codes), software modules and data from the storage 1630 and/or the communication apparatus 1640 to the memory 1620, and execute various processes according to them. As for the program, a program causing computers to execute at least a part of the operations described in the above embodiments may be employed. For example, the determining unit of the user terminal may be implemented by a control program stored in the memory 1620 and operated by the processor 1610, and other functional blocks may also be implemented similarly.

The memory 1620 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 1620 may also be referred to as a register, a cache, a main memory (a main storage apparatus) and the like. The memory 1620 may store executable programs (program codes), software modules and the like for implementing the method involved in one embodiment of the present disclosure.

The storage 1630 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 1630 may also be referred to as an auxiliary storage apparatus.

The communication apparatus 1640 is a hardware (transceiver device) performing communication between computers via a wired and/or wireless network, and is also referred to as a network device, a network controller, a network card, a communication module and the like, for example. The communication apparatus 1640 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 1640.

The input apparatus 1650 is an input device (e.g., a keyboard, a mouse, a microphone, a switch, a button, a sensor and the like) that receives input from the outside. The output apparatus 1660 is an output device (e.g., a display, a speaker, a Light Emitting Diode (LED) light and the like) that performs outputting to the outside. In addition, the input apparatus 1650 and the output apparatus 1660 may also be an integrated structure (e.g., a touch screen).

Furthermore, the respective apparatuses such as the processor 1610 and the memory 1620 are connected by the bus 1670 that communicates information. The bus 1670 may be constituted by a single bus or by different buses between the apparatuses.

Furthermore, the wireless base station and the user terminal may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 1610 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

Furthermore, the information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

The information, signals and the like that are input or output may be stored in a specific location (for example, in a memory), or may be managed in a control table. The information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH))). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), respective manners/embodiments of the present disclosure may also be applied. At this time, functions provided by the first communication device and the second communication device of the above device 1600 may be regarded as functions provided by the user terminal. Furthermore, the words "uplink" and "downlink" may also be replaced with "side". For example, an uplink channel may be replaced with a side channel.

Also, the user terminal in this specification may be replaced with a wireless base station. At this time, functions provided by the above user terminal may be regarded as functions provided by the first communication device and the second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (New Radio Access Technology), NR (New Radio), NX (New radio access), FX (Future generation radio access), GSM (Global System for Mobile communications), CDMA 3000, UMB (Ultra Mobile Broadband), IEEE 920.11 (Wi-Fi®), IEEE 920.16 (WiMAX®), IEEE 920.20, UWB (Ultra-Wide Band), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A method for transmitting reference signals performed by a terminal, time-frequency resources for the terminal being divided into multiple groups of time-frequency resources, the method comprising:
   selecting a reference signal port for each group of time-frequency resources from candidate reference signal ports; and
   transmitting reference signals by using the reference signal port corresponding to each group of time-frequency resources in one transmission;
   wherein the candidate reference signal ports constitute one or more sets of candidate reference signal ports;
   wherein the selecting a reference signal port for each group of time-frequency resources from candidate reference signal ports includes:

selecting a reference signal port for a first group of time-frequency resources from a first set of candidate reference signal ports; and determining, from the first set of candidate reference signal ports, reference signal ports for other groups of time-frequency resources of the multiple groups of time-frequency resources, according to the selected reference signal port for the first group of time-frequency resources and a reference signal port offset parameter.

2. The method of claim 1, wherein the time-frequency resources for the terminal being divided into multiple groups of time-frequency resources including:

physical resource blocks for the terminal being divided into multiple groups of physical resource blocks according to time-frequency resource division parameters.

3. The method of claim 1, wherein the time-frequency resources for the terminal being divided into multiple groups of time-frequency resources including:

reference signal symbols for the terminal being divided into multiple groups of reference signal symbols according to time-frequency resource division parameters.

4. The method of claim 1, wherein when the candidate reference signal ports constitute multiple sets of candidate reference signal ports, the multiple sets of candidate reference signal ports correspond to the multiple groups of time-frequency resources, the selecting a reference signal port for each group of time-frequency resources from candidate reference signal ports includes:

selecting a reference signal port for each group of time-frequency resources from each set of candidate reference signal ports, respectively.

5. The method of claim 1, wherein each set of candidate reference signal ports in the one or more sets of candidate reference signal ports includes at least reference signal ports corresponding to first-subtype reference signals of the reference signals.

6. The method of claim 1, further comprising:

determining a reference signal power parameter for each group of time-frequency resources;

wherein the transmitting reference signals by using the reference signal port corresponding to each group of time-frequency resources includes:

transmitting the reference signals by using the reference signal port corresponding to each group of time-frequency resources and with a transmission power indicated by the reference signal power parameter corresponding to each group of time-frequency resources.

7. A terminal, time-frequency resources for the terminal being divided into multiple groups of time-frequency resources, the terminal comprising:

a processor configured to select a reference signal port for each group of time-frequency resources from candidate reference signal ports; and a transmitter configured to transmit reference signals by using the reference signal port corresponding to each group of time-frequency resources in one transmission;

wherein the candidate reference signal ports constitute one or more sets of candidate reference signal ports; and wherein the processor selects a reference signal port for a first group of time-frequency resources from a first set of candidate reference signal ports, and determines, from the first set of candidate reference signal ports, reference signal ports for other groups of time-frequency resources of the multiple groups of time-frequency resources according to the selected reference signal port for the first group of time-frequency resources and a reference signal port offset parameter.

8. The terminal of claim 7, wherein the processor further determines a reference signal power parameter for each group of time-frequency resources;

wherein the transmitter is further configured to transmit the reference signals by using the reference signal port corresponding to each group of time-frequency resources and with a transmission power indicated by the reference signal power parameter corresponding to each group of time-frequency resources.

9. The terminal of claim 7, wherein the processor divides physical resource blocks for the terminal into multiple groups of physical resource blocks according to time-frequency resource division parameters.

10. The terminal of claim 7, wherein the processor divides reference signal symbols for the terminal into multiple groups of reference signal symbols according to time-frequency resource division parameters.

11. The terminal of claim 7, wherein when the candidate reference signal ports constitute multiple sets of candidate reference signal ports, the multiple sets of candidate reference signal ports correspond to the multiple groups of time-frequency resources, the processor selects a reference signal port for each group of time-frequency resources from each set of candidate reference signal ports, respectively.

12. The terminal of claim 7, wherein each set of candidate reference signal ports in the one or more sets of candidate reference signal ports includes at least reference signal ports corresponding to first-subtype reference signals of the reference signals.

* * * * *